United States Patent
Islam et al.

(10) Patent No.: US 6,646,788 B2
(45) Date of Patent: *Nov. 11, 2003

(54) SYSTEM AND METHOD FOR WIDE BAND RAMAN AMPLIFICATION

(75) Inventors: Mohammed N. Islam, Allen, TX (US); Carl A. Dewilde, Richardson, TX (US)

(73) Assignee: Xtera Communications, Inc., Allen, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/289,198

(22) Filed: Nov. 5, 2002

(65) Prior Publication Data

US 2003/0067674 A1 Apr. 10, 2003

Related U.S. Application Data

(63) Continuation of application No. 09/811,103, filed on Mar. 16, 2001, now Pat. No. 6,532,101.

(51) Int. Cl.[7] .............................. H01S 3/30; H04B 10/12
(52) U.S. Cl. .................. 359/334; 359/341.3; 359/337.4
(58) Field of Search .............................. 359/334, 337.1, 359/341.3, 337.4

(56) References Cited

U.S. PATENT DOCUMENTS

| | | | |
|---|---|---|---|
| 4,700,339 A | 10/1987 | Gordon et al. | 370/3 |
| 4,740,974 A | 4/1988 | Byron | 372/3 |
| 4,881,790 A | 11/1989 | Mollenauer | 350/96.16 |
| 4,932,739 A | 6/1990 | Islam | 350/96.15 |
| 4,952,059 A | 8/1990 | Desurvire et al. | 356/350 |
| 4,995,690 A | 2/1991 | Islam | 350/96.15 |
| 5,020,050 A | 5/1991 | Islam | 370/4 |
| 5,060,302 A | 10/1991 | Grimes | 359/135 |
| 5,078,464 A | 1/1992 | Islam | 385/122 |
| 5,101,456 A | 3/1992 | Islam | 385/27 |
| 5,115,488 A | 5/1992 | Islam et al. | 385/129 |
| 5,117,196 A | 5/1992 | Epworth et al. | 359/333 |
| 5,140,456 A | 8/1992 | Huber | 359/341 |

(List continued on next page.)

FOREIGN PATENT DOCUMENTS

| | | | |
|---|---|---|---|
| EP | 0 421 675 A2 | 4/1991 | H04B/10/16 |
| EP | 0 829 980 A2 | 3/1998 | H04J/14/02 |

(List continued on next page.)

OTHER PUBLICATIONS

S.V. Chernikov et al. "Broadband Raman Amplfieirs in the spectral range of 1480–1620 nm." OFC/IOOC Tech. Digest (vol. 2) Feb. 1999, pp. 117–119.*

S.V. Chernikov et al. "Broadband Silica Fibre Raman Ampliiers at 1.3 um and 1.5 um." ECOC'98, Sep. 1998, pp. 49–50.*

(List continued on next page.)

Primary Examiner—Thomas G. Black
Assistant Examiner—Andrew R Sommer
(74) Attorney, Agent, or Firm—Baker Botts L.L.P.

(57) ABSTRACT

A multi-stage Raman amplifier includes a first Raman amplifier stage having a first sloped gain profile operable to amplify a plurality of signal wavelengths, and a second Raman amplifier stage having a second sloped gain profile operable to amplify at least most of the plurality of signal wavelengths after those wavelengths have been amplified by the first stage. The second sloped gain profile is approximately complementary slope to the slope of the first sloped gain profile. The combined effect of the first and second Raman stages contributes to an approximately flat overall gain profile over the plurality of signal wavelengths.

45 Claims, 7 Drawing Sheets

U.S. PATENT DOCUMENTS

| | | | |
|---|---|---|---|
| 5,191,628 A | 3/1993 | Byron | 385/27 |
| 5,224,194 A | 6/1993 | Islam | 385/122 |
| 5,225,922 A | 7/1993 | Chraplyvy et al. | 359/124 |
| 5,257,124 A | 10/1993 | Glaab et al. | 359/124 |
| 5,295,209 A | 3/1994 | Huber | 385/37 |
| 5,369,519 A | 11/1994 | Islam | 359/173 |
| 5,485,536 A | 1/1996 | Islam | 385/31 |
| 5,497,386 A | 3/1996 | Fontana | 372/18 |
| 5,513,194 A | 4/1996 | Tamura et al. | 372/6 |
| 5,557,442 A | 9/1996 | Huber | 359/179 |
| 5,559,920 A | 9/1996 | Chraplyvy et al. | 385/123 |
| 5,623,508 A | 4/1997 | Grubb et al. | 359/341 |
| 5,633,750 A | 5/1997 | Nogiwa et al. | 359/341 |
| 5,664,036 A | 9/1997 | Islam | 385/31 |
| 5,673,280 A | 9/1997 | Grubb et al. | 372/3 |
| 5,768,012 A | 6/1998 | Zanoni et al. | 359/341 |
| 5,778,014 A | 7/1998 | Islam | 372/6 |
| 5,790,289 A | 8/1998 | Taga et al. | 359/124 |
| 5,796,909 A | 8/1998 | Islam | 385/147 |
| 5,798,853 A | 8/1998 | Watanabe | 359/160 |
| 5,801,860 A | 9/1998 | Yoneyama | 359/124 |
| 5,815,518 A | 9/1998 | Reed et al. | 372/6 |
| 5,835,259 A | 11/1998 | Kakui et al. | 359/134 |
| 5,852,510 A | 12/1998 | Meli et al. | 359/341 |
| 5,878,071 A | 3/1999 | Delavaux | 372/94 |
| 5,887,093 A | 3/1999 | Hansen et al. | 385/27 |
| 5,905,838 A | 5/1999 | Judy et al. | 385/123 |
| 5,920,423 A | 7/1999 | Grubb et al. | 359/341 |
| 5,959,750 A | 9/1999 | Eskildsen et al. | 359/134 |
| 5,959,766 A | 9/1999 | Otterbach et al. | 359/337 |
| 5,978,130 A | 11/1999 | Fee et al. | 359/341 |
| 6,008,933 A | 12/1999 | Grubb et al. | 359/341 |
| 6,040,933 A | 3/2000 | Khaleghi et al. | 359/124 |
| 6,043,927 A | 3/2000 | Islam | 359/332 |
| 6,049,413 A | 4/2000 | Taylor et al. | 359/337 |
| 6,052,393 A | 4/2000 | Islam | 372/6 |
| 6,055,092 A | 4/2000 | Sugaya et al. | 359/337 |
| 6,067,177 A | 5/2000 | Kanazawa | 359/124 |
| 6,072,601 A * | 6/2000 | Toyohara | 358/484 |
| 6,081,366 A | 6/2000 | Kidorf et al. | 359/341 |
| 6,088,152 A * | 7/2000 | Berger et al. | 359/124 |
| 6,094,296 A | 7/2000 | Kosaka | 359/341 |
| 6,101,024 A | 8/2000 | Islam et al. | 359/334 |
| 6,104,733 A | 8/2000 | Espindola et al. | 372/6 |
| 6,104,848 A | 8/2000 | Toyohara et al. | 385/24 |
| 6,115,157 A | 9/2000 | Barnard et al. | 359/124 |
| 6,115,174 A | 9/2000 | Grubb et al. | 359/334 |
| 6,134,034 A | 10/2000 | Terahara | 359/124 |
| 6,147,794 A * | 11/2000 | Stentz | 359/124 |
| 6,151,160 A * | 11/2000 | Ma et al. | 359/124 |
| 6,163,636 A | 12/2000 | Stentz et al. | 359/124 |
| 6,172,803 B1 | 1/2001 | Masuda et al. | 359/341 |
| 6,185,022 B1 | 2/2001 | Harasawa | 359/124 |
| 6,219,162 B1 | 4/2001 | Barnard et al. | 359/124 |
| 6,219,176 B1 | 4/2001 | Terahara | 359/341 |
| 6,229,937 B1 | 5/2001 | Nolan et al. | 385/24 |
| 6,236,487 B1 | 5/2001 | Stephens | 359/124 |
| 6,236,496 B1 | 5/2001 | Yamada et al. | 359/341 |
| 6,239,902 B1 | 5/2001 | Islam et al. | 359/334 |
| 6,239,903 B1 | 5/2001 | Islam et al. | 359/337 |
| 6,263,139 B1 | 7/2001 | Kawakami et al. | 385/123 |
| 6,271,945 B1 | 8/2001 | Terahara | 359/124 |
| 6,282,002 B1 | 8/2001 | Grubb et al. | 359/160 |
| 6,310,716 B1 | 10/2001 | Evans et al. | 359/334 |
| 6,320,884 B1 * | 11/2001 | Kerfoot et al. | 359/334 |
| 6,335,820 B1 | 1/2002 | Islam | 359/334 |
| 6,341,034 B1 | 1/2002 | Sun et al. | 359/341.41 |
| 6,344,922 B1 | 2/2002 | Grubb et al. | 359/134 |
| 6,356,383 B1 | 3/2002 | Cornwell, Jr. et al. | 359/334 |
| 6,356,384 B1 | 3/2002 | Islam | 359/334 |
| 6,359,725 B1 | 3/2002 | Islam | 359/334 |
| 6,370,164 B1 | 4/2002 | Islam | 372/6 |
| 6,374,006 B1 | 4/2002 | Islam et al. | 385/15 |
| 6,381,391 B1 | 4/2002 | Islam et al. | 385/123 |
| 6,384,962 B1 | 5/2002 | Foursa et al. | 359/334 |
| 6,384,963 B2 | 5/2002 | Ackerman et al. | 359/334 |
| 6,388,801 B1 | 5/2002 | Sugaya et al. | 359/334 |
| 6,404,523 B1 | 6/2002 | Morikawa et al. | 359/124 |
| 6,404,964 B1 | 6/2002 | Bhagavatula et al. | 385/123 |
| 6,414,786 B1 | 7/2002 | Foursa | 359/334 |
| 6,417,959 B1 | 7/2002 | Bolshtyansky et al. | 359/334 |
| 6,433,920 B1 | 8/2002 | Welch et al. | 359/334 |
| 6,433,921 B1 | 8/2002 | Wu et al. | 359/334 |
| 6,437,906 B1 | 8/2002 | Di Pasquale et al. | 359/337.2 |
| 6,532,101 B2 * | 3/2003 | Islam et al. | 359/334 |
| 2001/0014194 A1 * | 8/2001 | Sasaoka et al. | 385/15 |
| 2001/0050802 A1 | 12/2001 | Namiki et al. | 359/337.11 |
| 2002/0001123 A1 | 1/2002 | Miyakawa et al. | 359/334 |
| 2002/0048062 A1 | 4/2002 | Sakamoto et al. | 359/124 |
| 2002/0060821 A1 | 5/2002 | Manna et al. | 359/124 |

FOREIGN PATENT DOCUMENTS

| | | | | |
|---|---|---|---|---|
| EP | 0 841 764 A2 | 5/1998 | | H04B/10/24 |
| EP | 0 903 876 A1 | 3/1999 | | H04B/10/17 |
| EP | 0 903 877 A2 | 3/1999 | | H04B/10/18 |
| EP | 0 911 926 A1 | 4/1999 | | H01S/3/10 |
| EP | 0 959 578 A2 | 11/1999 | | H04J/14/02 |
| EP | 1 054 489 A2 * | 11/2000 | | |
| EP | 1 069 712 A2 | 1/2001 | | H04B/10/17 |
| EP | 1 180 860 A1 | 2/2001 | | H04B/10/17 |
| FR | 2 764 452 A1 | 12/1998 | | H04J/14/02 |
| JP | 0 9 197452 A | 7/1997 | | G02F/1/35 |
| WO | 98/36479 | 8/1998 | | H01S/3/10 |
| WO | 98/42088 | 9/1998 | | H04B/10/17 |
| WO | 99/41855 | 8/1999 | | H04B/10/02 |
| WO | 99/43117 | 8/1999 | | H04J/14/00 |
| WO | 99/48176 | 9/1999 | | H01S/3/30 |
| WO | 99/49580 | 9/1999 | | |
| WO | 99/62407 | 12/1999 | | A61X/17/04 |
| WO | 99/66607 | 12/1999 | | |
| WO | 00/49721 | 8/2000 | | |
| WO | 00/72479 | 11/2000 | | H04B/10/08 |
| WO | 00/73826 A2 | 12/2000 | | G02B/6/00 |
| WO | 01/52372 A1 | 7/2001 | | H01S/3/30 |
| WO | 01/76350 A2 | 10/2001 | | |
| WO | 01/78264 A2 | 10/2001 | | H04B/10/00 |
| WO | 01/78263 A2 | 10/2002 | | H04B/10/00 |

OTHER PUBLICATIONS

Suzuki et al. "50 GHz spaced 32×10Gbit/s dense WDM transmission in zero–dispersion region region over 640 km of dispersion shifted fibre with multiwavelength distributed Raman amplification." Elect. Lett. 35:14, Jul. 1999. pp. 1175–1176.*

Emori et al. "100 nm bandwidth flat–gain Raman amplifiers pumped and gain–equalised by 12–wavelength–channel WDM laser diode unit." Elect. Lett. 35:16, Aug. 1999. pp. 1355, 1356.*

Koch, et al. "Broadband gain flattened Raman Amplifier to extend operation in the third telecommunication window." OFC 200 Mar. 7–10, 2000, pp. 103–105.*

Emori et al. "Cost–effective depolarized diode pump unit desigend for C–Band flat–gain Raman amplifiers to control EDFA gain profile." OFC 2000, Mar. 7–10, 2000, pp. 106–108.*

Emori et al. "100 nm bandwidth flat gain Raman amplifiers pumped and gian equalized by 12–wavelength–channel WDM hihg power laser diodes." OFC/IOOC Tech. Digest, 1999; Feb. 1999, pp. PD19–1 to PD 19–3.*

Lewis et. al. "Gain and Saturation characteristics of dual-wavelength–pumped silica–fibre Raman amplifiers." Elect. Lett. 35:14, Jul. 1999. pp. 1178–1179.*

G.P. Agrawal, "Fiber–Optic Communicatiiton Systems," 2nd Ed. John Wiley & Sons, 1997. pp. 365–366.*

H.S. Seo et al. Simultaneous Amplification and Channel Equalization using Raman Amplfieir for 30 Channels in 1.3–um Band. J. Lightwave. Tech. 19:3, Mar. 2001. pp. 391–397.*

H.S. Seo et al. "Compensation of Raman–Induced Crosstalk Using a Lumped Germanosilicate Fiber Raman Amplifier in the 1.571–1.591–um Region." IEEE Photonics Tech. Lett. 13:1, Jan. 2001. pp. 28–30.*

Chraplyvy et al., "Equalization in Amplified WDM Lightwave Transmission Systems," IEEE Photonics Technology Letters, vol. 4, No. 8, pp. 920–922, Aug. 1992.

Tonguz et al., "Gain Equalization of EDFA Cascades," Journal of Lightwave Technology, vol. 15, No. 10, pp. 1832–1841, Oct. 1997.

Forghieri et al., "Simple Model of Optical Amplifier Chains to Evaluate Penalties in WDM Systems," Journal of Lightwave Technology, vol. 16, No. 9, pp. 1570–1576.

Letellier et al., "Access to Transmission Performance Margins Through Pre–emphasis Adjustment in WDM Systems," ECOC, pp. 275–276, Sep. 20–24, 1998.

Manna et al., "Modeling of Penalties on Chains of Optical Amplifiers with Equalizing Filters," Journal of Lightwave Technology, vol. 18, No. 3, pp. 295–300, Mar. 2000.

Menif et al., "Application of Preemphasis to Achieve Flat Output OSNR in Time–Varying Channels in Cascaded EDFAs Without Equalization," Journal of Lightwave Technology, vol. 19, No. 10, pp. 1440–1452, Oct. 2001.

Murakami et al., "WDM Upgrading of an Installed Submarine Optical Amplifier System," Journal of Lightwave Technology, vol. 19, No. 11, pp. 1665–1674, Nov. 2001.

Scheerer et al., "SRS crosstalk in preemphasized WDM Systems," pp. WM28–1/293–WM28–3/295.

Notification of Transmittal of The International Search Report mailed Feb. 13, 2003 corresponding to International Application No. PCT/US02/07941 filed Mar. 14, 2002, 5 total pages, Feb. 13, 2003.

Stolen et al., "Parametric Amplification and Frequency Conversion in Optical Fibers," IEEE Journal of Quantum Electronics, vol. QE–18, No. 7, pp. 1062–1072, Jul. 1982.

Liaw et al., "Passive Gain–Equalized Wide–Band Erbium–Doped Fiber Amplifier Using Samarium–Doped Fiber," IEEE Photonics Technology Letters, vol. 8, No. 7, pp. 879–881, Jul. 1996.

Song et al., "Sensitivity improvement for NRZ optical systems using NALM and narrow–band filter," LEOS, vol. 2, pp. 111–112, Nov. 18–19, 1996.

White et al.; "Optical Fiber Components and Devices," L. A. Coldren and B. J. Thibeault, Optical Fiber Telecommunications 111B, eds. I.P Kaminow and T.L. Koch, Academic Press, Ch. 4, 1997.

Zyskind et al., "Optical Fiber Components and Devices," Optical Fiber Telecommunications IIIB, eds. I.P. Kaminow and T.L. Koch, Academic Press, Ch. 2, 1997.

Yariv, "Optical Electyronics in Modern Communications," Oxford University Press, 5th edition, Ch. 11, 1997.

Nissov et al., "100 Gb/s (10×10Gb/s) WDM Transmission Over 7200 km Using Distributed Raman Amplification," European Conference on Optical Communications, paper PD–9, pp. 9–12, Sep. 1997.

Hansen et al., "Loss compensation in dispersion compensating fiber modules by Raman amplification," Optical Fiber Conference OFC'98, paper TuD1, Technical Digest, San Jose, CA, pp. 20–21, Feb. 1998.

Rottwitt, et al., "A 92 nm Bandwidth Raman Amplifier," OSA Optical Fiber Conference, San Jose, CA, paper PD–6, pp. 1–4, Feb. 1998.

Vareille et al., "Numerical Optimisation of Power Conversion Efficiency in 1480nm Multi–Stokes Raman Fibre Lasers," Electronics Letters, vol. 34, No. 7, pp. 675–676, Apr. 2, 1998.

Walker, OSA Conference on Optical Amplifiers and Their Applications, paper MB–1, Vail, CO, Jul. 1998.

Masuda et al., "Ultrawide 75–nm 3–dB Gain–Band Optical Amplification with Erbium–Doped Fluoride Fiber Amplifiers and Distributed Raman Amplifiers," IEEE Photonics Technology Letters, vol. 10, No. 4, pp. 516–518, Apr. 1998.

Dianov et al., "High efficient 1.3$\mu$m Raman fiber amplifier," Electronics Letters, vol. 34, No. 7, pp. 669–670, Apr. 2, 1998.

Srivastava et al., "High–speed WDM Transmission in All-Wave™ Fiber in Both the 1.4–$\mu$m amd 1.55–$\mu$um Bands," OSA Conference on Optical Amplifiers and Their Applications, paper PD–2–5, Vail, CO, Jul. 1998.

Emori et al., "Less than 4.7 dB Noise Figure Broadband In–line EDFA with A Raman Amplified–1300 ps/nm DCF Pumped by Multi–channel WDM Laser Diodes," OSA Conference, paper PD3–1–5, Vail, CO, Jul. 1998.

Leng et al., "8–channel WDM soliton amplification and signal recovery," ECOC, vol. 1, pp. 105–106, Sep. 20–24, 1998.

Lewis et al., "1.4W Saturated Output Power froma Fibre Raman Amplfiier," OFC Technical Digest, paper WG5, pp. 114–116, 1999.

Freeman et al., "High Capacity EDFA with Output Power to Support Densley Loaded Channels," OFC Technical Digest, paper WA6, pp. 16–18, 1999.

Goldberg et al., "High Power Side–Pumped Er/Yb Dobed Fiber Amplifier," OFC Technical Digest, Paper WA7, pp. 19–21, 1999.

Pasquale et al., "23 dBm Output Power Er/YbCo–Doped Fiber Amplifier for WDM Signals inthe 1575–1605 nm Wavelength region," OFC Technical Digest, paper WA2, pp. 4–6, 1999.

Becker et al., "Erbium Doped Fiber Amplifiers Fundamentals and Technology," Academic Press, pp. 55–60, 1999.

Arend et al., "A nonlinear amplifying loop miror operating with wavelength division multiplexed data," LEOS, vol. 2, pp. 479–480, 1999.

Masuda et al., "Wide–Band and Gain–Flattened Hybrid Fiber Amplifier Consisting of an EDFA and a Multiwavelength Pumped Raman Amplifier," IEEE Photonics Technology Letters, vol. 11, No. 6, pp. 647–649, Jun. 1999.

Nissov et al, "Rayleigh crosstalk in long cascades of distributed unsaturated Raman amplifiers," Electronics Letters, vol. 35, No. 12, pp. 997–998., Jun. 10, 1999.

Kawai, et al. "Wide–Bandwidth and Long–Distance WDM Transmission Using Highly Gain–Flattened Hybrid Amplifier," IEEE Photonics Technology Letters vol. 11, No. 7, pp. 886–888, Jul. 1999.

Yun et al., "Dynamic Erbium–Doped Fiber Amplifier Based on Active Gain–Flattening with Fiber Acoustooptic Tunable Filters," IEEE Photonics Technology Letters, vol. 11, No. 10, pp. 1229–1231, Oct. 1999.

Namiki et al., "Recent Advances in Ultra–Wideband Raman Amplifiers," OFCC, vol. 4, pp 98–99, Mar. 7–10, 2000.

Lewis et al., "Low–Noise High GainDispersion Compensating Broadband Raman Amplifier," OFCC, vol. 1, pp 5–7, Mar. 7–10, 2000.

Roy et al., "48% Power Conversion Efficiency in a Single–Pump Gain–Shifted Thulium–Doped Fiber Amplifier," OFCC, vol. 4, pp. 17–22, Mar. 7–10, 2000.

Fludger et al., "An Analysis of the Improvements in OSNR from Distributed Raman Amplifiers Using Modern Transmission Fibres," OFCC, vol. 4, pp. 100–102, Mar. 7–10, 2000.

Nielsen et al., "3.28 Tb/s (82×40 Gb/s) transmission over 3×100 Kkm nonzero–dispersion fiber using dual C–and L–band hybrid Raman/Erbium–doped inline amplifiers," OFCC 2000, pp. 1229–1231, Mar. 7–10, 2000.

Provino et al., "Broadband and Nearly Flat Parametric Gain in Single–Mode Fibers," Lasers and Electro–Optics Europe, p. 1, Sep. 10–15, 2000.

Rini et al., "Numerical Modeling and Optimization of Cascaded CW Raman Fiber Lasers," IEEE Journal of Quantum Electronics, vol. 36, No. 10, pp. 1117–1122, Oct. 2000.

Aso et al., "Recent Advances in Ultra–Broadband Fiberoptics Wavelength Converters," Lasers and Electro–Optics Society 2000 Annual Meeting, vol. 2, pp. 683–684, Nov. 13–16, 2000.

Fludger et al., "Fundamenal Noise Limits in Broadband Raman Amplifiers," OFCC, vol. 1, pp. MA5/1–Ma5/3, Mar. 17–22, 2001.

Jackson, Theoretical Characterization of Raman Oscillation with Intracavity Pumping of Fiber Lasers, IEEE Journal of Quantum Electronics, vol. 37, No. 5, pp. 626–634, May 2001.

Pending U.S. patent application Ser. No. 09/811,067, entitled "Method and System for Reducing Degredation of Optical Signal to Noise Ratio," pp. 1–74, filed Mar. 16, 2001.

Pending U.S. patent application Ser. No. 09/916,454; entitled "System and Method for Controlling Noise Figure," pp. 1–51, filed Jul. 27, 2001.

Pending U.S. patent application Ser. No. 10/028,576; entitled "Optical Amplification Using Launched Signal Powers Selected as a Function of a Noise Figure," pp. 1–77, filed Dec. 20, 2001.

Pending U.S. patent application Ser. No. 09/768,367, entitled "All Band Amplifier," pp. 1–57, filed Jan. 22, 2001.

Pending U.S. patent application Ser. No. 09/766,489; entitled "Nonlinear Polarization Amplifiers in Nonzero Dispersion Shifted Fiber,", filed Jan. 19, 2001.

Pending U.S. patent application Ser. No. 09/800,085; entitled "Dispersion Compensating Nonlinear Polarization Amplifier", Filed Mar. 5, 2001.

Pending U.S. patent application Ser. No. 09/719,591; entitled "Fiber–Optic Compensation for Dispersion, Gain Tilt, and Band Pump Nonlinearity", Filed Jun. 16, 1999.

Pending U.S. patent application Ser. No. 09/765,972; entitled "S+Band Nonlinear Polarization Amplifiers", Filed Jan. 19, 2001.

Pending U.S patent application Ser. No. 10/003,199; entitled "Broadband Amplifier and Communication System", Filed Oct. 30, 2001.

Pending U.S patent application Ser. No. 10/003,199; entitled "Multi–Stage Optical Amplifier and Broadband Communication System", Filed Oct. 30, 2001.

Pending U.S. patent application Ser. No. 10/005,472; entitled "Multi–Stage Optical Amplifier and Broadband Communication System", Filed Nov. 6, 2001.

Pending U.S. patent application Ser. No. 10/014,839; entitled "Multi–Stage Optical Amplifier and Broadband Communication System", Filed Dec. 10, 2001.

Pending U.S. patent application Ser. No. 09/990,142;entitled "Broadband Amplifier and Communication System,", Filed Nov. 20, 2001.

Pending U.S. patent application Ser. No. 10/100,591; entitled "System and Method for Managing System Margin," pp. 1–89, Filed Mar. 15, 2002.

Pending U.S. Patent application Ser. No. 10/100,587; entitled "Fiber Optic Transmission System with Low Cost Transmitter Compensation", Filed Mar. 15, 2002.

Pending U.S. patent application Ser. No. 10/116,487; entitled "Fiber Optic Transmission System for a Metropolitan Area Network," pp. 1–54, Filed Apr. 3, 2002.

Pending U.S. patent application Ser. 10/100,700; entitled "Rack System for an End Terminal in an Optical Communication Network," pp. 1–74, Filed Mar. 15, 2002.

PCT International Search Report Form PCT/ISA/210, May 19, 1999.

PCT International Search Report Form PCT/ISA/210, Aug. 23, 1999.

PCT International Search Report Form PCT/ISA/210, Dec. 21, 2001.

PCT International Search Report Form PCT/ISA/210, Jan. 22, 2002.

Hiroji Masuda and Shingo Kawal, Ultra Wide–Band Raman Amplification With A Total Gain–Bandwidth of 132 nm Of Two Gain–Bands Around 1.5 $\mu$m, ECOC '99, Nice, France, pp. II–146–II–147, Sep. 26–30, 1999.

Sugizaki, et al., Slope Compensating DCF for S–band Raman Amplifier, OSA TOPS vol. 60, Optical Amplifiers and Their Applications, Nigel Jolley, John D. Minelly, and Yoshiaki Nakano, eds., 2001 Optical Society of America, pp. 49–53, 2001.

Vasilyev, et al., Pump intensity noise and ASE spectrum of Raman amplification in non–zero dispersion–shifted fibers, reprinted from the Optical Amplifiers and Their Applications Conference, 2001 Technical Digest, 2001 Optical Society of America, pp. 57–59.

Chernikov et al., "Broadband Raman amplifiers in the spectral range of 1480–1620 nm," OFC/IOOC Technical Digest, vol. 2, pp. 117–119, Feb. 21–26, 1999.

Chernikov et al., "Broadband Silica Fibre Raman Amplifiers at 1.3 $\mu$m and 1.5 $\mu$m," ECOC, pp. 49–50, Sep. 20–24, 1998.

Suzuki et al., "50 GHz spaced, 32×10 Gbit/s dense WDM transmission in zero–dispersion region over 640km of dispersion–shifted fibre with multiwavelength distributed Raman amplification," Electronics Letters, vol. 35, No. 14, pp. 1175–1176, Jul. 8, 1999.

Emori et al., "100nm bandwidth flat–gain Raman amplifiers pumped and gain–equalised by 12–wavelength–channel WDM laser diode unit," Electronics Letters, vol. 35, No. 16, pp. 1355–1356, Aug. 5, 1999.

Koch et al., "Broadband gain flattened Raman Amplifier to extend operation in the third telecommunication window," FF1, pp. 103–105.

Emori et al., "Cost–effective depolarized diode pump unit designed for C–band flat–gain Raman amplifiers to control EDFA gain profile," FF4–1–3, pp. 106–108.

Lewis et al., "Gain and saturation characteristics of dual–wavelength–pumped silica–fibre Raman amplifiers," Electronics Letters, vol. 35, No. 14, pp. 1178–1179, Jul. 8, 1999.

Agrawal, "Fiber–Optic Communication Systems," Second Edition, Basic Concepts, John Wiley & Sons, Inc., pp. 365–366 plus title page and copyright page, 1997.

Seo et al., "Simultaneous Amplification and Channel Equalization Using Raman Amplifier for 30 Channels in 1.3–$\mu$m Band," Journal of Lightwave Technology, vol. 19, No. 3, pp. 391–397, Mar. 2001.

PCT/US99/06231 International Search Report (May 19, 1999).

PCT/US 01/05089 International Search Report (Dec. 21, 2001).

PCT/US 99/06428 International Search Report (Aug. 23, 1999).

PCT/US 01/11894 International Search Report (Jan. 22, 2002).

* cited by examiner

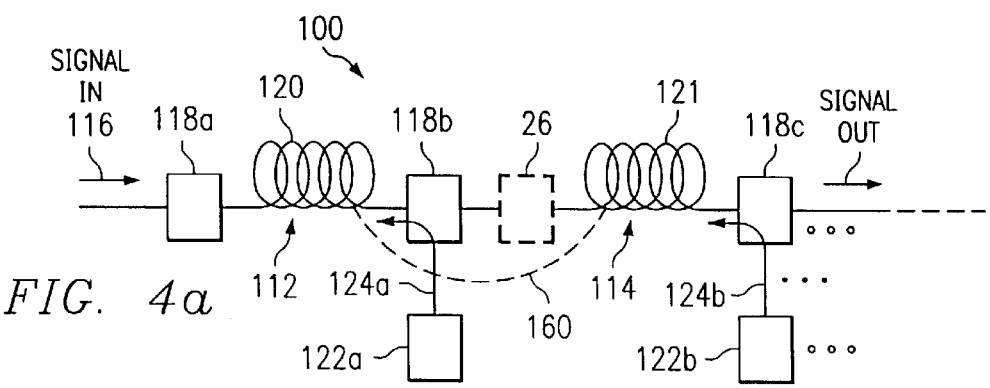
FIG. 4a
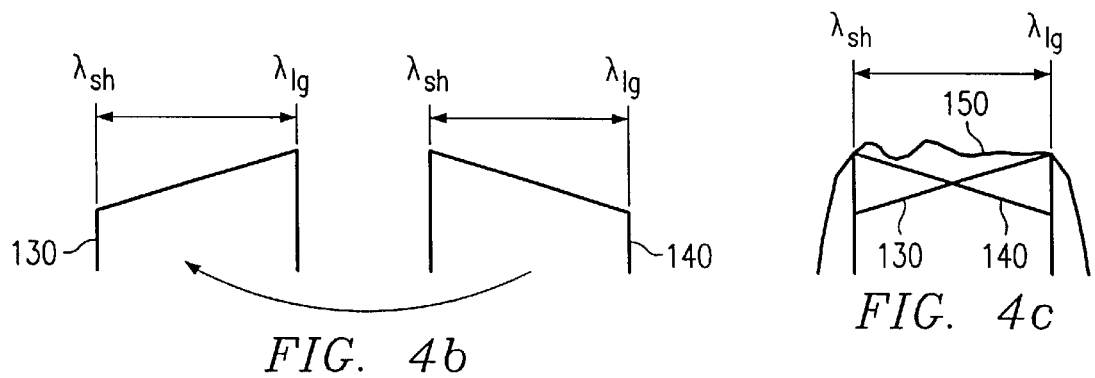
FIG. 4b
FIG. 4c
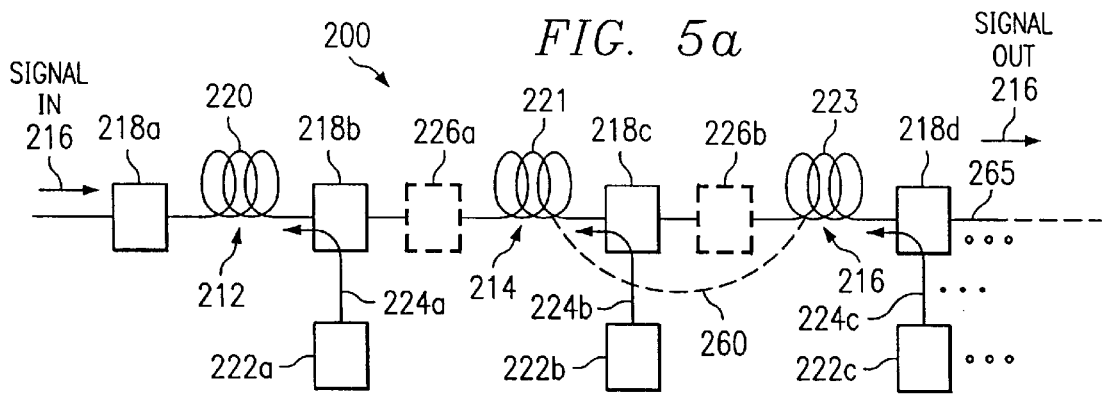
FIG. 5a
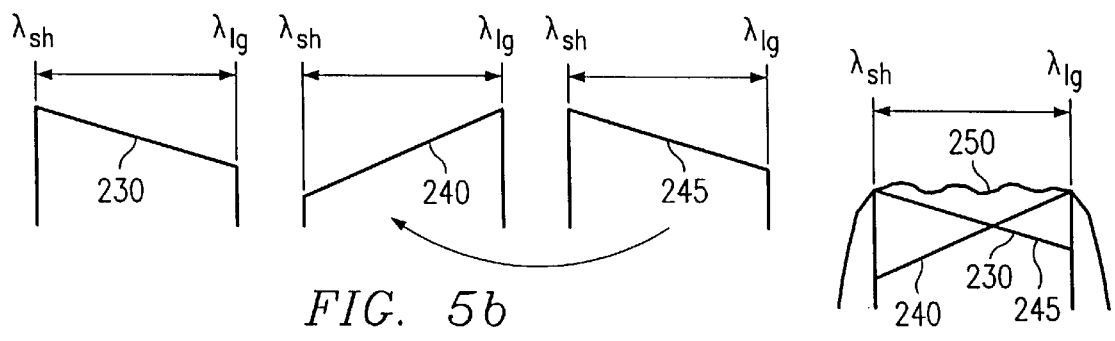
FIG. 5b
FIG. 5c

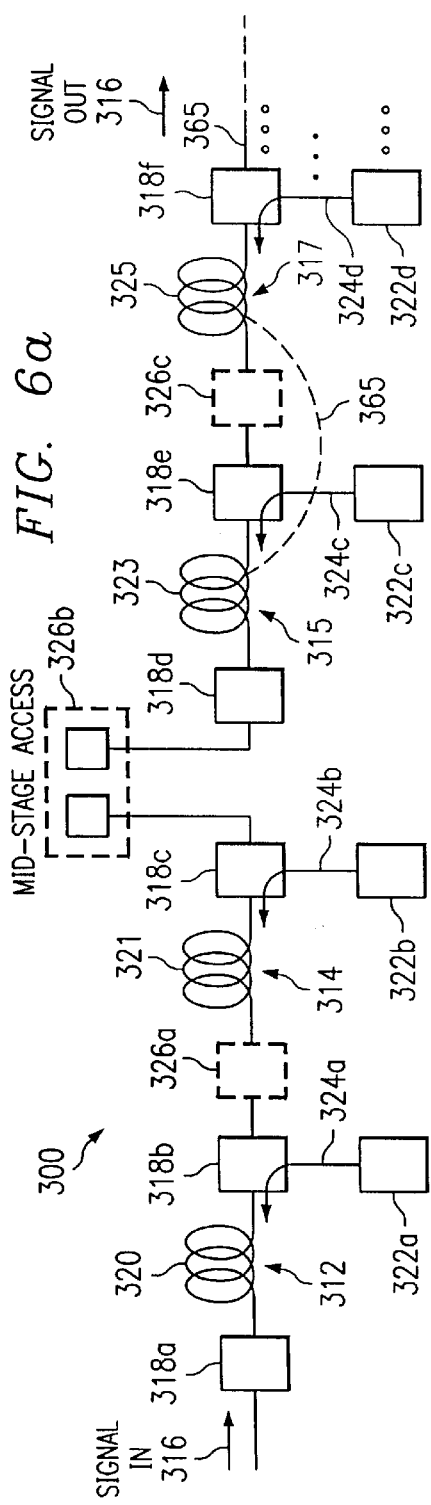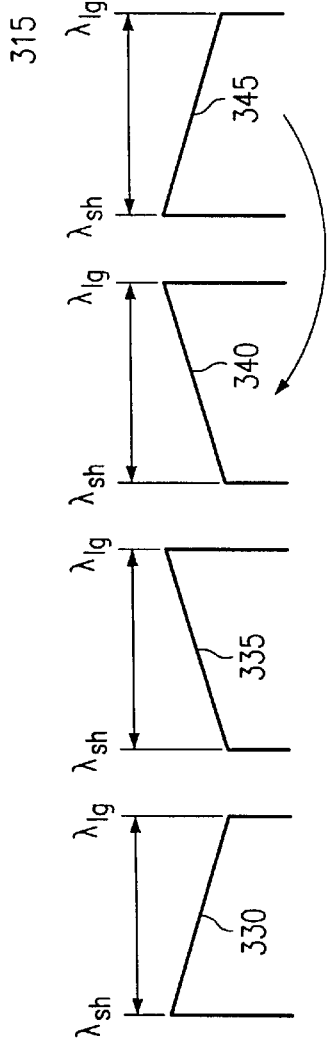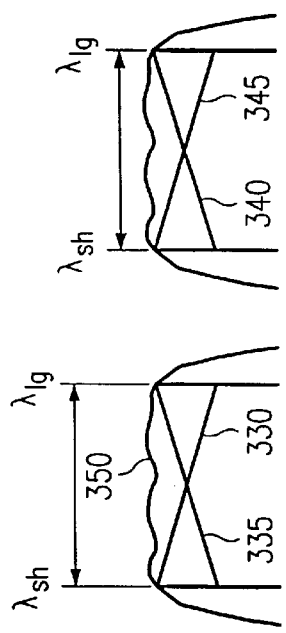
FIG. 6a
FIG. 6b
FIG. 6c

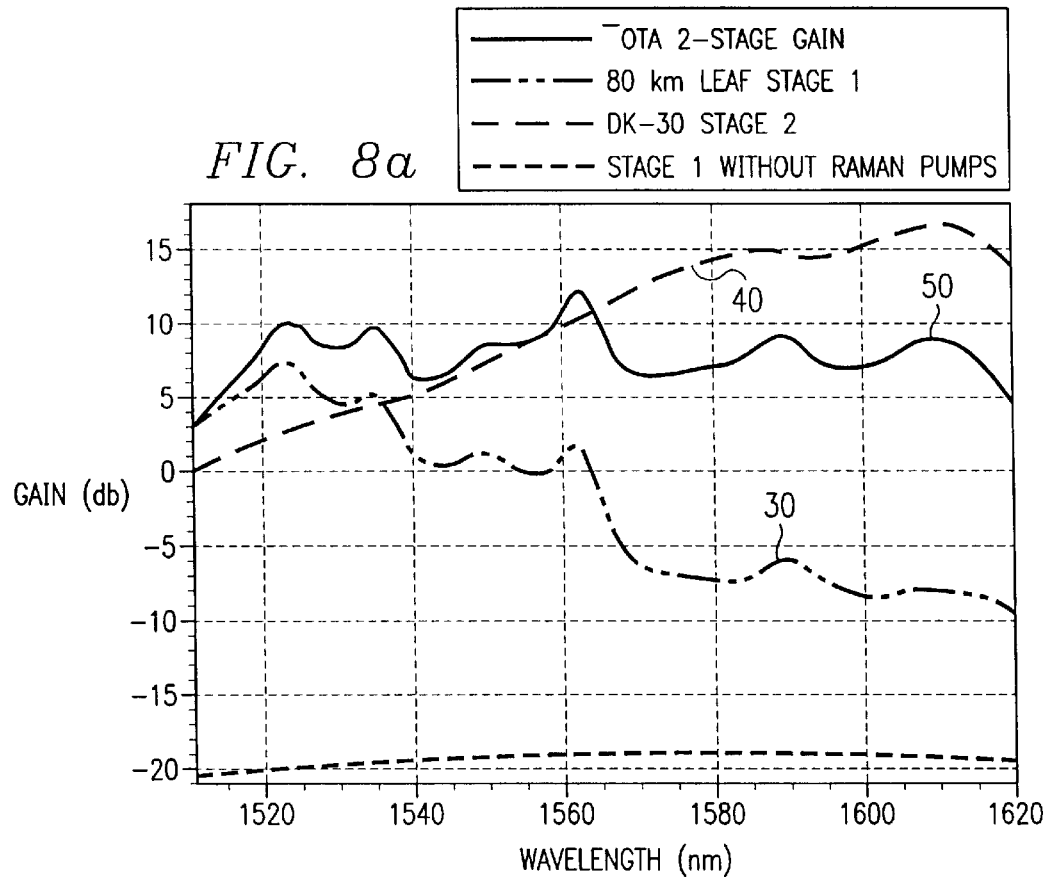
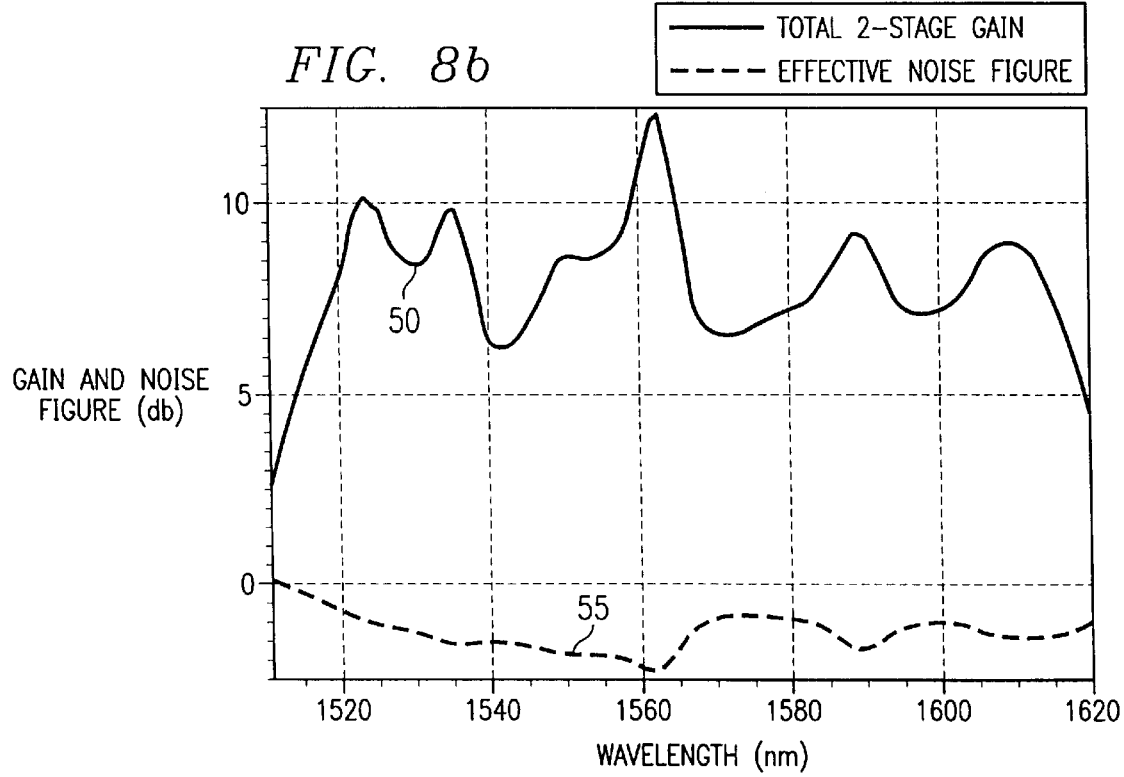

SYSTEM AND METHOD FOR WIDE BAND RAMAN AMPLIFICATION

CROSS REFERENCE TO RELATED APPLICATIONS

This application is a continuation of U.S. application Ser. No. 09/811,103, filed Mar. 16, 2001, now U.S. Pat. No. 6,532,101, by Mohammed N. Islam, Carl A. DeWilde, and Michael J. Freeman and entitled "SYSTEM AND METHOD FOR WIDE BAND RAMAN AMPLIFICATION".

STATEMENT OF OTHER APPLICATIONS

This application discloses subject matter that is in some respects similar to that disclosed in copending application Ser. No. 09/811,067, entitled Method and System for Reducing Degradation of Optical Signal to Noise Ratio, filed Mar. 16, 2001 and now U.S. Pat. No. 6,532,101.

This application also discloses subject matter that is in some respects similar to that disclosed in copending application Ser. No. 09/768,367, entitled All Band Amplifier, filed Jan. 22, 2001. application Ser. No. 09/768,367 is a continuation-in-part of U.S. application Ser. No. 09/719,591, filed Dec. 12, 2000, which claims the benefit of copending application serial number PCT/US99/13551, entitled Dispersion Compensating and Amplifying Optical Element, Method for Minimizing Gain Tilt and Apparatus for Minimizing Non-Linear Interaction Between Band Pumps, filed on Jun. 16, 1999, and published on Dec. 23, 1999 as WO 99/66607, which in turn claims the benefit of U.S. application serial No. 60/089,426.

This application and U.S. application Ser. Nos. 09/768,367 and 09/811,067 are currently assigned to Xtera Communications, Inc.

TECHNICAL FIELD OF THE INVENTION

The present invention relates to the field of communication systems, and more particularly to a system and method operable to facilitate wide band optical amplification while maintaining acceptable noise figures.

BACKGROUND OF THE INVENTION

Because of the increase in data intensive applications, the demand for bandwidth in communications has been growing tremendously. In response, the installed capacity of telecommunication systems has been increasing by an order of magnitude every three to four years since the mid 1970s. Much of this capacity increase has been supplied by optical fibers that provide a four-order-of-magnitude bandwidth enhancement over twisted-pair copper wires.

To exploit the bandwidth of optical fibers, two key technologies have been developed and used in the telecommunication industry: optical amplifiers and wavelength-division multiplexing (WDM). Optical amplifiers boost the signal strength and compensate for inherent fiber loss and other splitting and insertion losses. WDM enables different wavelengths of light to carry different signals in parallel over the same optical fiber. Although WDM is critical in that it allows utilization of a major fraction of the fiber bandwidth, it would not be cost-effective without optical amplifiers. In particular, broadband optical amplifier systems that permit simultaneous amplification of many WDM channels are a key enabler for utilizing the full fiber bandwidth.

Traditionally, amplification of signals having a broad range of wavelengths has required separating the signals into subsets of wavelengths, and amplifying each subset with a separate amplifier. This approach can be complex and expensive. Using separate amplifiers for each subset requires additional hardware, additional laser pumps for each amplifier, and additional power to launch the additional pumps.

Although a more efficient approach would be to amplify the entire signal using a single amplifier for at least some amplifiers in the system, unfortunately, no acceptable single amplifier approach has been developed. For example, erbium doped-amplifiers are an inherently bad choice for wide band amplification if the ultimate goal is to provide an amplifier that can operate over the entire telecommunications spectrum. For example, for wavelengths shorter than about 1525 nanometers, erbium-atoms in typical glasses will absorb more than they amplify. Even with use of various dopings, such as, aluminum or phosphorus, the absorption peak for the various glasses is still around 1530 nanometers. This leaves a large gap in the short communications band (S-Band) unreachable by erbium doped fiber amplifiers.

Raman amplifiers provide a better solution in terms of broadband amplification potential, but conventional Raman amplifiers have suffered from other shortcomings. For example, Raman amplifiers have traditionally suffered from high noise figures when used in wide band applications. In addition, Raman amplifiers suffer from gain tilt introduced when longer wavelength signals rob energy from shorter wavelength signals. This effect becomes increasingly pronounced as amplifier launch power and system bandwidth increases. Wide band Raman amplifiers operating at high launch powers on a wide range of wavelengths can be particularly vulnerable to this effect.

Masuda, et al. (see e.g., U.S. Pat. No. 6,172,803 B1 and related research papers) have attempted to improve the bandwidth of erbium doped amplifiers by cascading with the erbium doped amplifier a Raman amplifier with an approximately complementary gain profile. Masuda, et al, however, consistently require the presence of an erbium doped amplifier (which relies on different physics for amplification and does not suffer from the same noise problems as Raman amplifiers do) to provide virtually all amplification to signal wavelengths close in spectrum to the pump wavelengths. Indeed, Masuda, et al. concede that the noise figures they report ignore the effect of the Raman portion of their amplifier.

SUMMARY OF THE INVENTION

The present invention recognizes a need for a method and apparatus operable to facilitate wide band Raman amplification while maintaining an approximately flat gain profile and an acceptable noise figure.

In accordance with the present invention, a system and method for providing wide band Raman amplification are provided that substantially reduce or eliminate at least some of the shortcomings associated with prior approaches. In one aspect of the invention, a multi-stage Raman amplifier comprises a first Raman amplifier stage having a first sloped gain profile operable to amplify a plurality of signal wavelengths, and a second Raman amplifier stage having a second sloped gain profile operable to amplify at least most of the plurality of signal wavelengths after those wavelengths have been amplified by the first stage. The second sloped gain profile has an approximately complementary slope to the slope of the first sloped gain profile. The combined effect of the first and second Raman stages contributes to an approximately flat overall gain profile over the plurality of signal wavelengths.

In another aspect of the invention, a method of amplifying an optical signal having multiple wavelengths comprises amplifying a plurality of signal wavelengths at a first Raman amplifier stage having a first sloped gain profile, and amplifying at least most of the plurality of signal wavelengths at a second Raman amplifier stage after those signal wavelengths have been amplified by the first stage. The second stage has a second sloped gain profile comprising an approximately complimentary gain profile to the first gain profile. The combined effect of the first and second Raman stages contributes to an approximately flat overall gain profile over the plurality of signal wavelengths.

In still another aspect of the invention, a multi-stage Raman amplifier comprises a plurality of cascaded Raman amplifier stages each having a gain profile, wherein the gain profile of at least some of the Raman stages is sloped. At least two of the sloped gain profiles comprise approximately complimentary gain profiles, wherein the combined effect of the gain profiles of the amplification stages results in an approximately flat overall gain profile over a plurality of signal wavelengths amplified by the amplifier.

In yet another aspect of the invention, a method of amplifying multiple-wavelength optical signals comprises applying a first sloped gain profile to a plurality of signal wavelengths at a first stage of a Raman amplifier, and applying a second sloped gain profile to at least most of the plurality of signal wavelengths at a second stage of the Raman amplifier. The second gain profile comprises an approximately complementary gain profile of the first sloped gain profile. The combined effect of the first and second sloped gain profiles contributes to an approximately flat overall gain profile over the plurality of signal wavelengths.

In another aspect of the invention, a multi-stage Raman amplifier comprises a plurality of cascaded Raman amplifier stages each operable to amplify a plurality of signal wavelengths and each having a gain profile determined at least in part by one or more pump wavelengths applied to the amplifier stage. The plurality of amplifier stages comprise a first Raman stage operable to apply a higher gain level to a signal wavelength closest to a longest pump wavelength than a gain applied to a signal wavelength furthest from the longest pump wavelength.

In still another aspect of the invention, a method of amplifying an optical signal having multiple wavelengths comprises receiving a plurality of signal wavelengths at a plurality of cascaded Raman amplifier stages having at least a first stage and a last stage, where each stage is operable to amplify a plurality of signal wavelengths and each stage has a gain profile determined at least in part by one or more pump wavelengths applied to the amplifier stage. The method further includes applying a highest level of gain supplied by the longest pump wavelength in the last Raman stage of the amplifier.

In yet another aspect of the invention, a multi-stage Raman amplifier comprises a plurality of cascaded Raman amplifier stages, at least some of the Raman stages having sloped gain profiles operable to contribute to a combined gain profile of the amplifier. The combined gain profile of the amplifier is approximately flat across a bandwidth of at least eighty nanometers and comprises a small signal noise figure no greater than eight decibels.

In another aspect of the invention, a method of amplifying an optical signal having multiple wavelengths comprises amplifying a plurality of signal wavelengths at a first Raman amplifier stage having a first sloped gain profile, and amplifying at least most of the plurality of signal wavelengths at a second Raman amplifier stage having a second sloped gain profile that is different than the first sloped gain profile. The combined gain profile of the amplifier is approximately flat across a bandwidth of at least eighty nanometers and comprises a small signal noise figure no greater than eight decibels.

In another aspect of the invention, an optical pre-amplifier operable to be coupled to an optical communication link carrying optical signals having a plurality of wavelengths comprises a first Raman stage having a gain profile where a majority of shorter signal wavelengths are amplified more than a majority of longer signal wavelengths. The preamplifier further comprises a second Raman stage operable to receive at least most of the signal wavelengths after they have been amplified by the first stage, the second stage having a gain profile where a majority of longer signal wavelengths are amplified more than a majority of shorter signal wavelengths. In this embodiment, the gain profiles of the first and second Raman stages are operable to combine to contribute to an approximately flat combined gain profile over the plurality of signal wavelengths.

In still another aspect of the invention, an optical booster amplifier operable to be coupled to an optical communication link carrying optical signals having a plurality of wavelengths comprises a first Raman stage having a gain profile where a majority of longer signal wavelengths are amplified more than a majority of shorter signal wavelengths. The booster amplifier also comprises a second Raman stage operable to receive at least most of the signal wavelengths after they have been amplified by the first stage, the second stage having a gain profile where a majority of shorter signal wavelengths are amplified more than a majority of longer signal wavelengths. The gain profiles of the first and second Raman stages are operable to combine to contribute to an approximately flat combined gain profile over the plurality of wavelengths.

In yet another aspect of the invention, a Raman amplifier assembly comprises a preamplifier coupled to an optical communication link. The preamplifier includes a first Raman stage having a gain profile wherein a majority of shorter wavelengths are amplified more than a majority of longer wavelengths, and a second Raman stage having a gain profile approximately complementary to the first gain stage. The amplifier assembly also includes a booster amplifier coupled to the optical communication link. The booster amplifier comprises a first Raman stage having a gain profile wherein a majority of longer wavelengths are amplified more than a majority of shorter wavelengths, and a second Raman stage having a gain profile approximately complementary to the first gain stage.

In another aspect of the invention, an optical communication system operable to facilitate communication of multiple signal wavelengths comprises a transmitter bank operable to generate a plurality of signal wavelengths, and a multiplexer operable to combine the plurality of signal wavelengths into a single multiple wavelength signal for transmission over a transmission medium. The system further comprises an amplifier coupled to the transmission medium and operable to amplify the multiple wavelength signal prior to, during, or after the multiple wavelength signal's transmission over the transmission medium, the amplifier comprising a multi-stage Raman amplifier. The amplifier includes a first Raman amplifier stage having a first sloped gain profile operable to amplify a plurality of signal wavelengths and a second Raman amplifier stage having a second sloped gain profile operable to amplify at least most of the plurality of signal wavelengths after those wavelengths have been amplified by the first stage. The second sloped gain profile has an approximately complementary slope to the slope of the first sloped gain profile, and the combined effect of the first and second Raman stages contributes to an approximately flat overall gain profile over the plurality of signal wavelengths. In one embodiment, the system further includes a demultiplexer operable to receive the multiple wavelength signal and to separate the signal wavelengths from the multiple wavelength signal, and a receiver bank operable to receive the plurality of signal wavelengths.

Depending on the specific features implemented, particular embodiments of the present invention may exhibit some, none, or all of the following technical advantages. For example, one aspect of the invention facilitates optical amplification of a wide bandwidth of wavelengths while maintaining an approximately flat gain profile and an acceptable noise figure.

In a particular embodiment, one aspect of the invention reduces the noise figure associated with the amplifier by amplifying in a first Raman stage a majority of shorter wavelengths more than a majority of longer wavelengths. In this way, shorter wavelengths (which are often closest to the pump wavelength) are amplified to overcome any effects that might be caused by phonon-stimulated noise. As a further enhancement, the amplifier could be designed so that the longest pump wavelength is at least ten nanometers below the shortest signal being amplified.

In addition to yielding an acceptable noise figure, this approach can produce an approximately flat gain tilt, for example, by cascading a second Raman amplifier stage having a gain profile that amplifies a majority of longer wavelengths more than a majority of shorter wavelengths. In a particular embodiment, the second gain profile can be approximately complementary to the first gain profile. In some applications, the second gain profile can have an approximately equal (although opposite) slope from the first gain profile.

Another aspect of the invention results in increased efficiency in a multi-stage Raman amplifier. This aspect of the invention involves applying, in at least one Raman stage, a first gain profile that amplifies a majority of longer wavelengths more than a majority of shorter wavelengths; and applying, in a later cascaded Raman stage, a second gain profile that amplifies a majority of shorter wavelengths more than a majority of longer wavelengths. This embodiment facilitates allowing longer pump wavelengths in the first stage to accept energy from shorter pump wavelengths in the later Raman stage. This effect, in turn, facilitates using smaller pump wavelengths and/or fewer pump wavelengths in the first stage than would otherwise be required, thereby increasing the efficiency of the device. In a particular embodiment, the gain profiles of the first and later Raman stages can be approximately complimentary, contributing to an approximately flat overall gain profile for the amplifier. The noise figure can be reduced, for example, by performing a majority of the amplification of wavelengths closest to the pump wavelengths in one of the final amplifier stages, or in the last amplifier stage.

Other aspects of the invention facilitate cascading multiple amplifier stages to realize advantages of low noise and high efficiency in a multiple stage Raman amplifier. Moreover, cascaded stages can provide mid-stage access to the amplifier to facilitate, for example, optical add/drop multiplexing of WDM signals while maintaining an acceptable noise figure and an approximately flat gain profile, both at the mid-stage access point and across the entire amplifier.

Other technical advantages are readily apparent to one of skill in the art from the attached figures, description, and claims.

BRIEF DESCRIPTION OF THE DRAWINGS

For a more complete understanding of the present invention, and for further features and advantages thereof, reference is now made to the following description taken in conjunction with the accompanying drawings, in which:

FIG. 4a is a block diagram of an exemplary embodiment of a multiple stage Raman amplifier constructed according to the teachings of the present invention;

FIGS. 4b–4c show gain profiles associated with various amplification stages and an overall gain profile for the amplifier shown in FIG. 4a, respectively, constructed according to the teachings of the present invention;

FIG. 5a is a block diagram of an exemplary embodiment of a three stage Raman amplifier constructed according to the teachings of the present invention;

FIGS. 5b–5c show gain profiles associated with various amplification stages and an overall gain profile for the amplifier shown in FIG. 5a, respectively, constructed according to the teachings of the present invention;

FIGS. 6a is a block diagram of an exemplary embodiment of a four stage Raman amplifier constructed according to the teachings of the present invention;

FIGS. 6b–6c show gain profiles associated with various amplification stages and an overall gain profile for the amplifier of FIG. 6a, respectively, constructed according to the teachings of the present invention;

FIGS. 8a–8b show simulated gain and noise profiles for one embodiment of a multi-stage hybrid Raman amplifier constructed according to the teachings of the present invention.

DETAILED DESCRIPTION OF THE INVENTION

Figure 1:
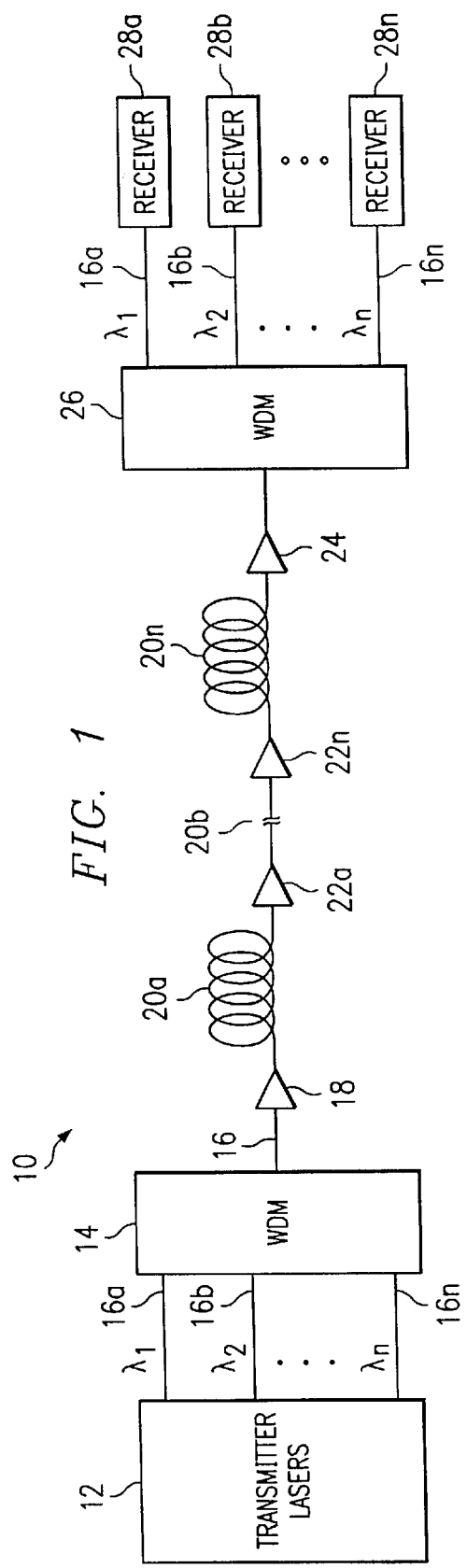
FIG. 1 is a block diagram showing an exemplary optical communication system operable to facilitate communication of wide band optical signals constructed according to the teachings of the present invention.

FIG. 1 is a block diagram showing an exemplary optical communication system 10 operable to facilitate communication of wide band optical signals. System 10 includes a transmitter bank 12 operable to generate a plurality of wavelength signals 16a–16n. Transmitter bank 12 may include, for example, a plurality of laser diodes or semiconductor lasers. Each wavelength signal 16a–16n comprises at least one wavelength of light unique from wavelengths carried by other signals 16.

System 10 also includes a combiner 14 operable to receive multiple signal wavelengths 16a–16n and to combine those signal wavelengths into a single multiple wavelength signal 16. As one particular example, combiner 14 could comprise a wavelength division multiplexer (WDM). The term wavelength division multiplexer as used herein may include conventional wavelength division multiplexers or dense wavelength division multiplexers.

In one particular embodiment, system 10 may include a booster amplifier 18 operable to receive and amplify wavelengths of signal 16a prior to communication over a transmission medium 20. Transmission medium 20 can comprise multiple spans 20a–20n of fiber. As particular examples, fiber spans 20 could comprise standard single mode fiber (SMF), dispersion-shifted fiber (DSF), non-zero dispersion-shifted fiber (NZDSF), or other fiber type or combinations of fiber types.

Where communication system 10 includes a plurality of fiber spans 20a–20n, system 10 can include one or more inline amplifiers 22a–22m. Inline amplifiers 22 reside between fiber spans 20 and operate to amplify signal 16 as it traverses fiber 20.

Optical communication system 10 can also include a preamplifier 24 operable to receive signal 16 from a final fiber span 20n and to amplify signal 16 prior to passing that signal to a separator 26. Separator 26 may comprise, for example, a wavelength division demultiplexer (WDM), which can operate on wavelength division multiplexed signals or dense wavelength division multiplexed signals. Separator 26 operates to separate individual wavelength signals 16a–16n from multiple wavelength signal 16. Separator 26 communicates individual signal wavelength 16a–16n to a bank of receivers 28.

At least one amplifier in system 10 comprises a wide band multi-stage Raman amplifier operable to receive a wide bandwidth of wavelength signal 16. In a particular embodiment, the amplifier can process over 80 nanometers of bandwidth, and in some cases over 100 nanometers of bandwidth while maintaining an approximately flat gain profile over the bandwidth of amplified signal wavelengths 16.

Throughout this document, the term "approximately flat" describes a condition where the maximum signal gain differs from the minimum signal gain by an no more than amount suitable for use in telecommunication systems. The deviation between minimum and maximum signal gains may comprise, for example five decibels prior to application of any gain flattening filters. Particular embodiments of the invention may achieve gain flatness of approximately three decibels prior to application of any gain flattening filters.

Some amplifiers in system 10 could comprise a plurality of individual amplifiers working in conjunction, each amplifying a subset of the bandwidth processed by the single wide band amplifier. Alternatively, all amplifiers in system 10 could comprises wide bandwidth amplifiers. Depending on the overall bandwidth communicated by system 10, one or more amplifier locations in system 10 could comprise a plurality of wide band amplifiers operating in conjunction to handle a total bandwidth significantly in excess of 100 nanometers. In other cases, a single wide band amplifier could process all traffic at a given location in system 10.

Wide band amplifiers within system 10 comprise multi-stage Raman amplifiers having at least two stages with approximately complimentary gain profiles. A combination of the complimentary gain profiles, in cooperation with any other gain stages in the wide band amplifier, results in approximately flat gain profile for the amplifier.

Throughout this description, the phrase "approximately complementary" refers to a situation where, at least in general, signal wavelengths 116 that are highly amplified in the first stage are less amplified in the second stage, and signal wavelengths 116 that are highly amplified in the second stage are less amplified in the first stage. Two gain profiles said to be "approximately complementary" need not have equal and opposite slopes. Moreover, equal amplification of any particular wavelengths in both gain profiles does not preclude those gain profiles from being "approximately complementary."

Conventional designs of multi-stage Raman amplifiers have been unable to process bandwidths in excess of 80 nanometers while maintaining approximately flat gain profiles and acceptable noise figures. One aspect of this invention recognizes that a major culprit in noise figures associated with conventional multi-stage Raman amplifiers is the phonon-stimulated optical noise created when wavelength signals being amplified reside spectrally close to pump wavelengths used for amplification. One aspect of the invention reduces adverse effect of this noise by enhancing the Raman amplification of signal wavelengths near the pump wavelengths to overcome the effects of the noise, and applying an approximately complementary Raman gain profile in another stage to result in an approximately flat overall gain profile.

Figure 2:
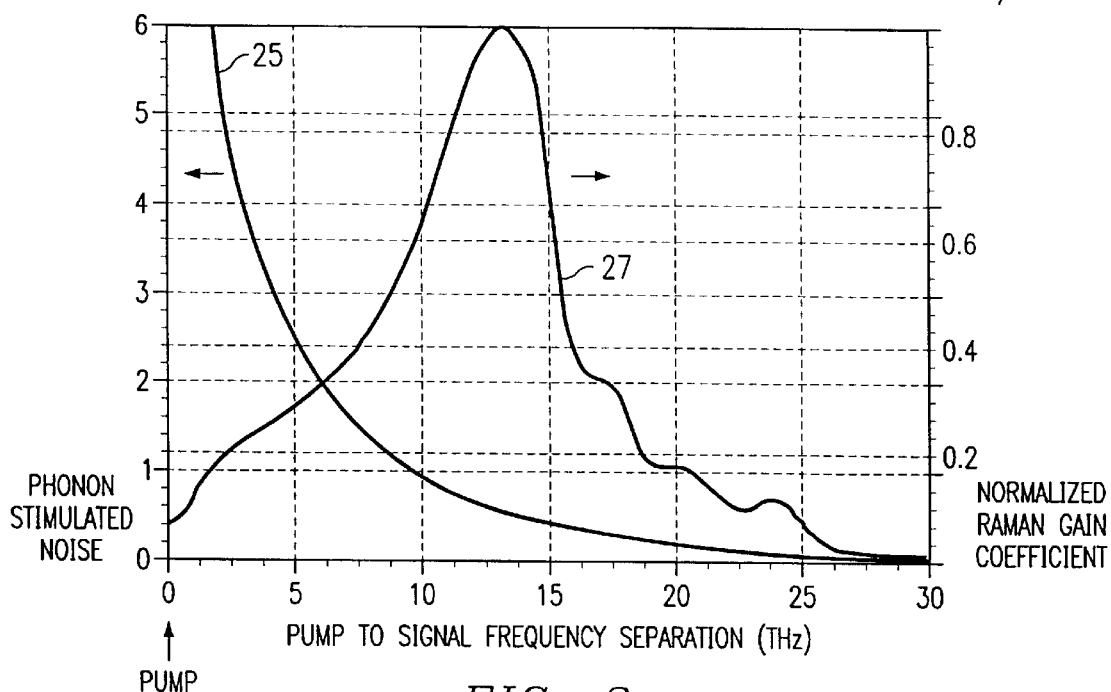
FIG. 2 is a graphical illustration of the phonon-stimulated optical noise figure.

FIG. 2 graphically illustrates the phonon-stimulated optical noise figure increase as the spectral spacing between signal wavelengths and pump wavelengths decreases. As shown in FIG. 2, phonon-stimulated noise increases dramatically as signal wavelength get close to the pump wavelengths.

One aspect of the invention significantly reduces adverse effects associated with phonon-stimulated noise by providing multiple stages of Raman gain having approximately complimentary gain profiles acting on substantially the same bandwidth of signals. While best results are obtained by applying approximately complimentary gain profiles to all or nearly all of the same signal wavelengths, some portion of wavelengths can be omitted from one gain profile and included in the other gain profile without departing from the scope of this invention.

Figure 3A:
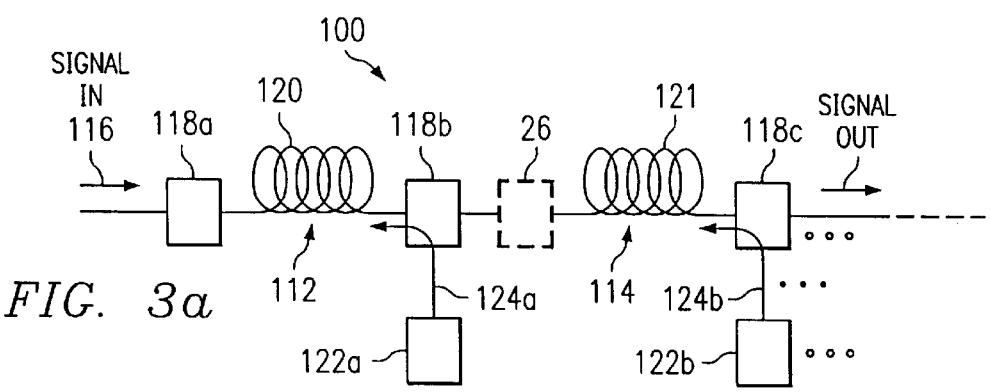
FIG. 3a is a block diagram of an exemplary embodiment of a multiple stage Raman amplifier constructed according to the teachings of the present invention.

FIG. 3a is a block diagram of an exemplary embodiment of a multiple stage Raman amplifier 110 including gain profiles 30 and 40 associated with various amplification stages and an overall gain profile 50 for the amplifier. In this example, amplifier 100 comprises a two-stage amplifier having a first stage 112 and a second stage 114 cascaded with first stage 112. As will be further discussed below, the invention is not limited to a particular number of amplifier stages. For example, additional amplification stages could be cascaded onto second stage 114. Moreover, although the illustrated embodiment shows second stage 114 cascaded directly to first stage 112, additional amplification stages could reside between first stage 112 and second stage 114 without departing from the scope of the invention.

Amplifier 100 could comprise a distributed Raman amplifier, a discrete Raman amplifier, or a hybrid Raman amplifier which comprises both discrete and distributed stages. Each stage 112, 114 of amplifier 100 includes an input operable to receive a multiple wavelength optical input signal 116. As a particular example, optical input signal 116 could include wavelengths ranging over one hundred nanometers.

Each stage 112, 114 also includes distributed gain media 120, 121. Depending on the type of amplifier being implemented, media 120, 121 may comprise, for example a transmission fiber, or a gain fiber such as a spooled gain fiber. In a particular embodiment, media 120, 121 may comprise a dispersion compensating fiber.

Each stage 112, 114 further includes one or more wavelength pumps 122. Pumps 122 generate pump light 124 at specified wavelengths, which are pumped into distributed gain media 120, 121. Raman gain results from the interaction of intense light from the pumps with optical phonons in silica fibers. The Raman effect leads to a transfer of energy from one optical beam (the pump) to another optical beam (the signal). Pumps 122 may comprise, for example, one or more laser diodes. Although the illustrated embodiment shows the use of counter propagating pumps, under some circumstances using a relatively quiet pump, co-propagating pumps could also be used without departing from the scope of the invention.

In one particular embodiment, pump wavelengths 124 can be selected so that the longest wavelength pump signal 124 has a wavelength that is shorter than the shortest wavelength of signal 116. As one specific example, the longest wavelength of pump light 124 could be selected to be, for example, at least ten nanometers shorter than the shortest wavelength of signal 116. In this manner, amplifier 100 can help to avoid phonon stimulated noise that otherwise occurs when pump wavelengths interact with wavelengths of the amplified signal.

Couplers 118b and 118c couple pump wavelengths 124a and 124b to gain distributed media 120 and 121, respectively. Couplers 118 could comprise, for example, wave division multiplexers (WDM) or optical couplers. A lossy element 126 can optionally reside between amplifier stages 112 and 114. Lossy element 126 could comprise, for example, an isolator, an optical add/drop multiplexer, or a gain equalizer.

Figures 3B, 3C:
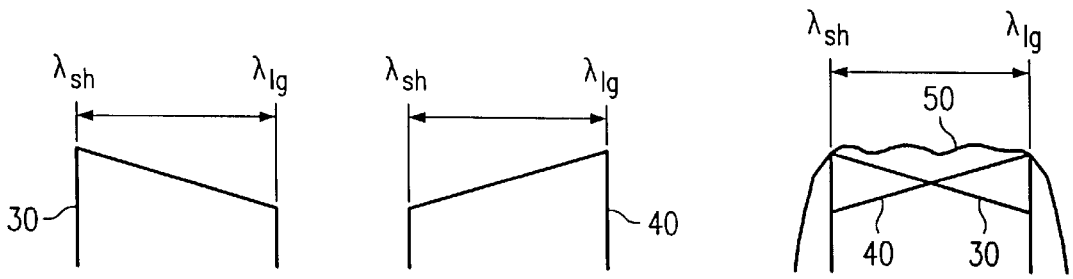
FIGS. 3b–3c show gain profiles associated with various amplification stages and an overall gain profile for the amplifier shown in FIG. 3a, respectively, constructed according to the teachings of the present invention.

The number of pump wavelengths 124, their launch powers, their spectral and spatial positions with respect to other pump wavelengths and other wavelength signals, and the bandwidth and power level of the signal being amplified can all contribute to the shape of the gain profile for the respective amplifier stage. FIG. 3b shows exemplary gain profiles for first stage 112 and second stage 114. Gain profile 30 shows the overall gain of first stage 112 of amplifier 100 for a bandwidth ranging from the shortest wavelength of signal 116 ($\lambda_{sh}$) to the longest wavelength of signal 116 ($\lambda_{lg}$). Gain profile 40 shows the overall gain of second stage 112 of amplifier 100 for a bandwidth ranging from the shortest wavelength of signal 116 ($\lambda_{sh}$) to the longest wavelength of signal 116 ($\lambda_{lg}$). Each of gain profiles 30 and 40 reflects the effects of the other gain profile acting upon it.

In this example, gain profile 30 of first stage 112 has a downward slope, where a majority of the shorter signal wavelengths 116 are amplified more than a majority of the longer signal wavelengths 116. Conversely, gain profile 40 of second stage 114 is approximately complimentary to gain profile 30 of first stage 112. Gain profile 40 exhibits an upward slope where a majority of the longer signal wavelengths 116 are amplified more than a majority of the shorter signal wavelengths 116.

Gain profile 50 (shown in dotted lines in FIG. 3c) represents an exemplary composite gain profile of amplifier 100 resulting from the application of gain profiles 30 and 40 to optical signal 116. Gain profile 50 is approximately flat over at least substantially all of the bandwidth of wavelengths within signal 116.

In operation, amplifier 100 receives optical input signal 116 at distributed gain medium 120 of first stage 112. Distributed gain medium 120 could comprise, for example, a dispersion compensating Raman gain fiber, a transmission fiber, a high non-linearly fiber, a segment of transmission fiber, or combination thereof. Pumps 122(a) generate pump wavelengths 124(a) and apply them to distributed gain medium 120 through coupler 118(b). Pump wavelengths 124 interact with signal wavelengths 116, transferring energy from the pump wavelengths 124 to the signal wavelengths 116. In this example, shorter signal wavelengths 116 are amplified more than longer signal wavelengths 116 in first stage 112.

Amplified wavelengths of signal 116 are communicated to distributed gain medium 121 of second stage 114. Wavelengths of signal 116 are amplified in second stage 114 by interacting with pump wavelengths 124b generated at pumps 122b. In this example, pump wavelengths 124b operate to result in gain profile 40 where longer wavelengths of signal 116 are amplified more than shorter wavelengths of signal 116.

The combined effect of amplification in first stage 112 and second stage 114 of amplifier 100 results in approximately flat gain profile 50 across wavelengths of optical signal 116. This particular example provides a significant advantage in reducing the noise figure associated with the amplifier. Using this configuration, the small signal noise figure of amplifier 100 can be reduced to less than eight decibels, in some cases 7 decibels, even where the bandwidth of signal 16 exceeds 100 nanometers.

FIG. 4a is a block diagram of another embodiment of a multiple stage Raman amplifier 110 including exemplary gain profiles 130 and 140 associated with various amplification stages and an overall gain profile 150 for the amplifier. Amplifier 110 shown in FIG. 4 is similar in structure and function to amplifier 100 shown in FIG. 1. Like amplifier 100 shown in FIG. 1, amplifier 110 of FIG. 4 includes a first Raman amplification stage 112 and a second Raman amplification stage 114. Each of stages 112 and 114 includes a distributed gain medium 120, 121, respectively, which is operable to receive multiple wavelength input signal 116 and pump wavelengths 124a and 124b, respectively. Each amplifier stage 112 and 114 operates to amplify wavelengths of signal 116 according to gain profiles 130 and 140 as shown.

The example shown in FIG. 4 differs from the example shown in FIG. 3 in that gain profile 130 (shown in FIG. 4b) of first stage 112 exhibits an upward slope where a majority of longer wavelengths of signal 116 are amplified more than the majority of shorter wavelengths of signal 116. Conversely, gain profile 140 of second stage 114 comprises an approximately complementary gain profile to first gain profile 130 of first stage 112. In profile 140 applies a higher gain to a majority of shorter wavelengths than the gain applied to the majority of longer signal wavelengths 116. In addition, in this embodiment, the launch power of pumps 122a driving first gain profile 130 can be reduced.

This aspect of the invention recognizes that due to the Raman scattering effect, longer wavelength signals tend to rob energy from shorter wavelength signals. This aspect of the invention leverages that fact to allow the longer pump wavelengths of wavelengths 124a to rob energy from the shorter pump wavelengths of wavelengths 124b. In a particular embodiment, amplifier 110 may include a shunt 160 between second distributed gain medium 121 and first distributed gain medium 120 to facilitate the longer pump wavelengths of wavelengths 124a accepting power from the shorter pump wavelengths of wavelengths 124b. The effects result in an overall gain profile 130 for first stage 112 that remains approximately complimentary to the gain profile of second stage 140. As a result, the composite gain profile 150 (FIG. 4c) of the amplifier remains approximately flat.

This embodiment provides significant advantages in terms of efficiency by allowing the use of fewer wavelength pumps 122a in the first stage 112, and/or also by allowing each pump 122a to operate at a lower launch power.

The embodiment shown in FIG. 4a can also provide improvements for the noise figure of the amplifier. For example, phonon stimulated noise is created in Raman amplifiers where wavelengths being amplified spectrally reside close to a wavelength of pump signals 124. One aspect of this invention recognizes that by spectrally separating pump wavelengths 124 from signal wavelengths 116, phonon stimulated noise can be reduced.

In a particular embodiment, pump wavelengths 124 are selected to have wavelengths at least 10 nanometers shorter than the shortest wavelength in optical signal 116 being amplified. Moreover, in a particular embodiment, second stage 114 where a majority of the gain to short wavelength of signal 116 is applied comprises the last stage of amplifier 110.

FIG. 5a is a block diagram of a three stage Raman amplifier 200 including gain profiles 230, 240, and 245 associated with various amplification stages, and an overall gain profile 250 for the amplifier. Amplifier 200 is similar in structure and function to amplifier 100 of FIG. 3 but includes three cascaded amplification stages 212, 214, and 215. Each of amplifier stages 212–215 includes a distributed gain medium 220, 221, 223, respectively, which operate to receive multiple wavelength optical signal 216 and pump wavelengths 224a–224c from pumps 222a–222c. Each amplifier stage includes an optical coupler operable to introduce pump wavelengths 224 to the respective gain media. In some embodiments, lossy elements 226 may reside between one or more amplification stages 212–215. Lossy elements 226 may comprise, for example, optical add/drop multiplexers, isolators, and/or gain equalizers.

Amplifier 200 may comprise a discrete Raman amplifier or a hybrid Raman amplifier. For example, first distributed gain medium 220 may comprise a transmission fiber, a section of transmission fiber, or a Raman gain fiber. In a particular embodiment, first distributed gain medium 220 could comprise a dispersion compensating Raman gain fiber.

Distributed gain medium 221 of second stage 214 may comprise a segment of transmission fiber or a Raman gain fiber. Distributed gain medium 223 of third amplifier phase 215 could comprise, for example, a Raman gain fiber. In particular embodiments, any or all of distributed gain mediums 220–223 could comprise a dispersion compensating Raman gain fiber.

In operation, amplifier 200 receives signal 216 at first stage 212 and applies a gain to signal wavelengths 216 according to gain profile 230 depicted in FIG. 5b. Signal 216 next traverses second stage 214 where gain profile 240 is applied. Finally, signal 216 is amplified by third stage 215 according to gain profile 245 shown in FIG. 3b. Signal 216 exits amplifier 200 at output 260 having been exposed to a composite gain profile 250 as shown in FIG. 3c.

In this particular example, first stage 212 and second stage 214 operate in a similar manner to amplifier 100 shown in FIG. 3a. In particular, first stage 212 applies a gain profile 230 that amplifies a majority of shorter signal wavelengths 216 more than it amplifies a majority of longer signal wavelengths 216. Second stage 214, conversely, applies and approximately complimentary gain profile 240 to signal 216, where the majority of longer wavelengths of signal 216 are amplified more than a majority of shorter wavelengths of signal 216.

The combination of second stage 214 and third stage 215, on the other hand, operates similarly to amplifier 110 shown in FIG. 4. While second stage 214 applies gain profile 240 amplifying a majority of longer signal wavelengths 216 more than a majority of shorter signal wavelengths 216, third stage 215 applies to gain profile 245, which amplifies a majority of shorter signal wavelengths 216 more than a majority of longer signal wavelengths 216. In this particular example, gain profile 240 of second stage 214 is approximately complimentary to both gain profile 230 of first stage 212 and gain profile 245 of third stage 215. In this example, the slope of gain profile 240 is significantly steeper than the slope of gain profiles 230 and 245 to account for the fact that gain profile 240 is the only profile exhibiting an upward slope. The composite gain profile 250 (shown in FIG. 5c) resulting from the combination of amplifications in first, second, and third amplifier stages of amplifier 200 results in an approximately flat gain profile.

This particular example reaps the efficiency benefits discussed with respect to FIG. 4, and permits use of the noise figure reduction techniques discussed with respect to FIGS. 3 and 4. For example, efficiency advantages are realized by allowing longer pump wavelengths 224 of second stage 214 to accept power from high powered shorter pump wavelengths 224c of third amplification stage 215. This results from the Raman effect wherein longer wavelength signals tend to rob energy from shorter wavelength signals. As a result, second stage 214 can be operated with fewer wavelength pumps than what otherwise be required, and also with lower pump launch powers.

In terms of improvements in noise figure, the gain profiles of first stage 212 compared to second stage 214 results in high amplification of shorter wavelengths of signal 216 to overcome phonon stimulated noise associated with interaction of those signals with the longer pump wavelengths 224a. In addition, providing a significant amount of amplification to shorter wavelengths of signal 216 in the last stage 215 of amplifier 220 helps to minimize the noise figure associated with amplifier 200.

FIGS. 6a–6c show a block diagram of a four stage Raman amplifier, gain profiles associated with various stages of the amplifier, and a composite gain of the amplifier respectively. Amplifier 300 is similar in structure and function to amplifiers 100 and 110 shown in FIGS. 1 and 2, respectively. In this example, amplifier 300 includes four Raman amplification stages 312, 314, 315, and 317. Each amplification stage includes a distributed gain medium 320, 321, 323, and 325, respectively. Distributed gain medium 320 of first stage 312 may comprise, for example, a transmission fiber or a Raman gain fiber. Each of distributed gain medium 312–325 of second, third, and fourth stages 314–317 may comprise a Raman gain fiber or a segment of transmission fiber. In particular embodiments, some or all of distributed gain media 320–325 could comprise dispersion compensating Raman gain fibers.

Each distributed gain medium 320–325 is operable to receive a multi wavelength optical signal 316 and amplify that signal by facilitating interaction between optical signal 316 and pump wavelengths 324a–324d. Pump wavelengths 324 are generated by pumps 322 and coupled to distributed gain media 320–325 through couplers 318. In this particular example, couplers 318 comprise wave division multiplexers.

In the illustrated embodiment, amplifier 300 includes at least one lossy element 326 coupled between amplifier stages. In this example, lossy element 326b comprises an optical add/drop multiplexer coupled between second stage 314 and third stage 315. Optical add/drop multiplexer 326b facilitates mid-stage access to amplifier 300 and allows selective addition and/or deletion of particular wavelengths from signal 316. Other lossy elements, such as isolators or gain equalizers could alternatively reside between amplifier stages.

In operation, signal 316 enters amplifier 300 at coupler 318a, which passes signal 316 to first amplifier stage 312 where a gain profile at 330, as shown in FIG. 4b, is applied to wavelengths of signal 316. Signal 316 is then passed to second stage 314 where a gain profile 335, as shown in FIG. 4b is applied to wavelengths of signal 316.

In this particular example, first and second stages 312 and 314 of amplifier 300 operate similarly to amplifier 100 described with respect to FIG. 3. In particular, first stage 312 applies a gain profile where a majority of shorter signal wavelengths are amplified more than a majority of longer signal wavelengths, and second stage 314 applies an approximately complimentary gain profile 335 where a majority of longer signal wavelengths are amplified more than a majority of shorter signal wavelengths. In this particular embodiment, the composite gain from first stage 312 and second stage 314 results in an approximately flat gain profile at the output of second stage 314. This design advantageously facilitates addition and subtraction of particular wavelengths of signal 316 without the need for further manipulation of the gain. In addition, first and second gain stages 312 and 314 provide a low noise figure, reducing the effects of phonon stimulated noise in shorter wavelength signals closest to the pump wavelengths.

Continuing with the operational description, particular wavelengths of signal 316 may be substituted with other wavelengths at add/drop multiplexer 326b. After processing by add/drop multiplexer 326b, signal 316 continues to third amplification stage 315, where gain profile 340 is applied as shown in FIG. 6b. Signal 316 is then communicated to fourth stage 317 where gain profile 345 is applied to wavelengths of signal 316. Amplified signal 316 is then output at output port 365.

Third and fourth amplification stages of amplifier 300 are similar in structure and function to amplifier 110 described with respect to FIG. 4. Through the use of this configuration, third and fourth amplifier stages 315 and 317 provide increased efficiency in operation. In particular, pump 322 can operate with fewer pump signals and/or lower launch power as a result of the Raman scattering effect which allows longer pump wavelengths 324c of third stage 316 to accept power from highly amplified shorter pump wavelengths 324d of fourth stage 317. Moreover, third and fourth amplification stages 315 and 317 assist in maintaining a low noise figure by applying a significant amount of the gain to the shortest wavelengths of signal 316 at the last amplifier stage 317.

Figure 7:
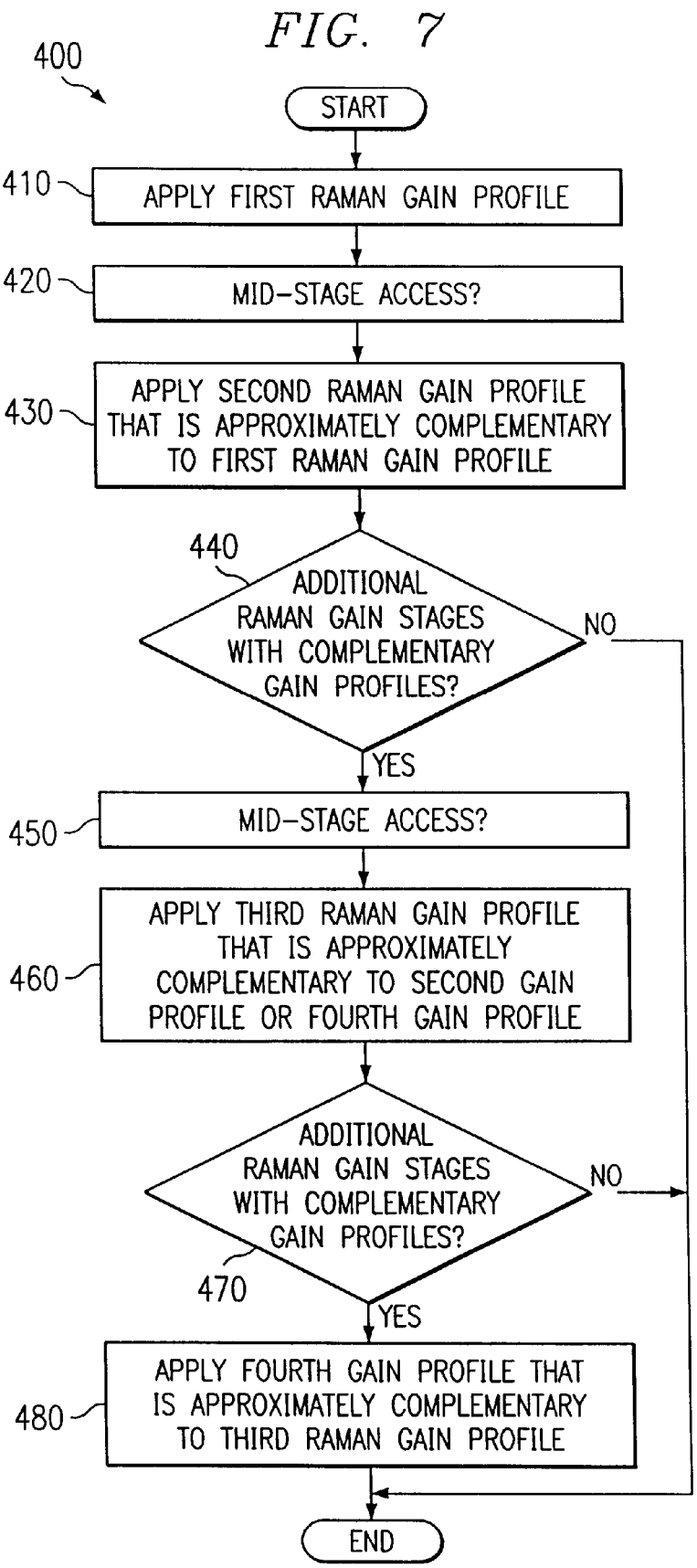
FIG. 7 is a flow chart illustrating one example of a method of amplifying a plurality of wavelengths using a multi-stage Raman amplifier according to the teachings of the present invention.

FIG. 7 is a flow chart showing one example of a method 400 of amplifying a multi-wavelength optical signal using a multi-stage Raman amplifier. This particular example uses FIGS. 6a–6c to illustrate the method. Similar methods could apply to any of the embodiments described herein. Method 400 begins at step 410 where first amplifier stage 312 receives signal wavelengths 316 and applies first gain profile 330 to those wavelengths. Step 420 allows for optional mid-stage access between first stage 312 and second stage 314. The method continues where second stage 314 applies second gain profile 325 to signal wavelengths 316 at step 430.

Second gain profile 335 is approximately complimentary to first gain profile 330. In this particular example, first gain profile 330 amplifies a majority of shorter signal wavelengths 316 more than a majority of longer signal wavelengths 316, while second gain profile 325 amplifies a majority of longer wavelength signals 316 more than a majority of shorter wavelength signals 316. Those gain profiles could be reversed if desired. Moreover, additional gain profiles could be applied between first stage 312 and second stage 314 by intervening stages (not explicitly shown). This particular example shows additional stages beyond first stage 312 and second stage 314. In a particular embodiment, an amplifier embodying the invention could comprise only two complimentary stages of Raman gain.

This example provides optional mid-stage access at step 450. Mid-stage access could comprise, for example, application of optical add/drop multiplexing, gain equalization, or the presence of one or more optical isolators.

Where amplifier 300 comprises more than two stages of complimentary Raman amplification, method 400 continues at step 460 where third stage 316 applies gain profile 340 to signal wavelengths 316. Where amplifier 300 comprises a three stage amplifier, third gain profile 340 can be complimentary to second gain profile 335. An example of this operation is shown in FIG. 5. Where amplifier 300 comprises a four stage amplifier, third stage 315 can apply gain profile at 340 as shown in FIG. 6b, while fourth stage 317 applies gain profile 345 as shown in FIG. 6b at step 480.

In this example, third gain profile 340 amplifies a majority of longer signal wavelengths 316 more than a majority of shorter signal wavelengths 316 while fourth stage 317 amplifies a majority of shorter signal wavelengths 316 more than a majority of longer signal wavelengths 316. In this manner, third and fourth stages of amplifier 300 can realize efficiency advantages by allowing longer pump wavelengths 324c from third stage 315 to accept energy from highly amplified shorter pump wavelengths 324d in fourth stage 317.

Although this method has described a four stage amplification process, the method can equally apply to any system having two or more Raman amplification stages. In addition, although this particular example described first and second gain stages having gain profiles 330 and 335 as shown in FIG. 6b, and third and fourth gain stages having gain profiles 340 and 345 as shown in FIG. 6b, those gain profiles could be reversed without departing from the scope of the invention. The particular example shown provides significant advantages in a four stage amplifier in that initial stages can be configured to provide a low noise figure by emphasizing amplification of shorter wavelength signals early in the amplification process. In addition, third and fourth amplification stages advantageously realize efficiency gains in amplifier locations where noise reduction is not as critical a concern.

Figure 9A:
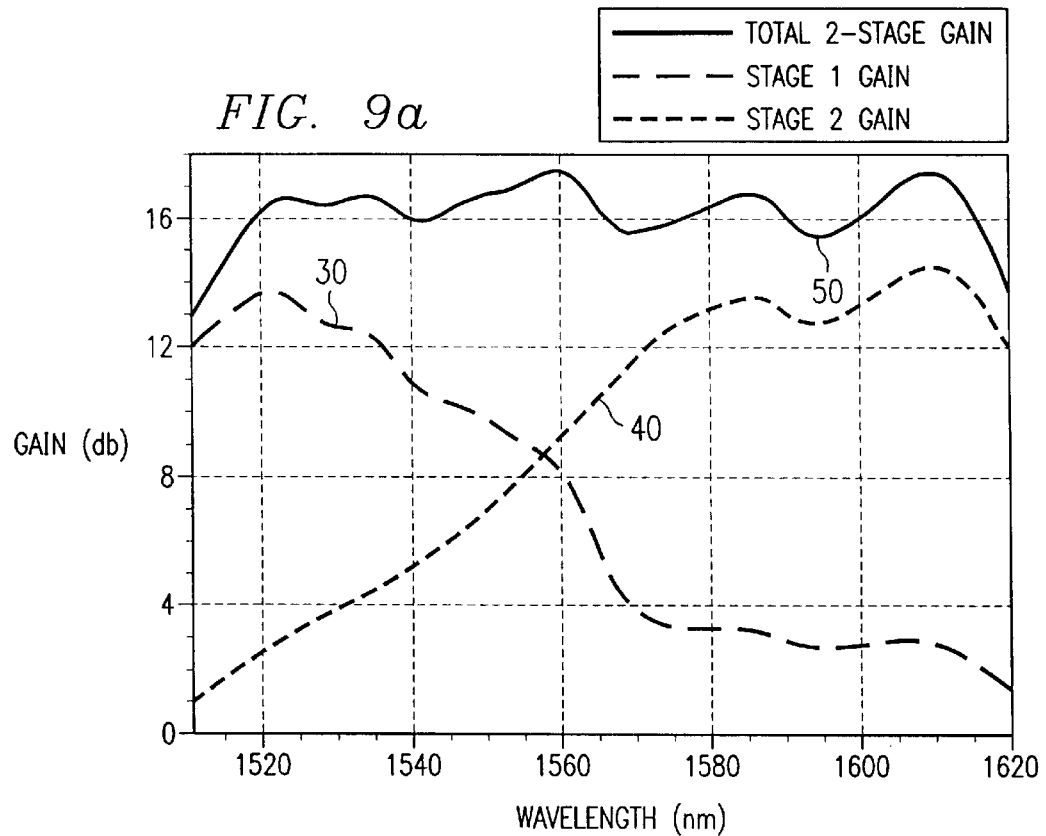
FIGS. 9a–9b show simulated gain and noise profiles for one embodiment of a multi-stage discrete Raman amplifier constructed according to the teachings of the present invention.
Figure 9B:
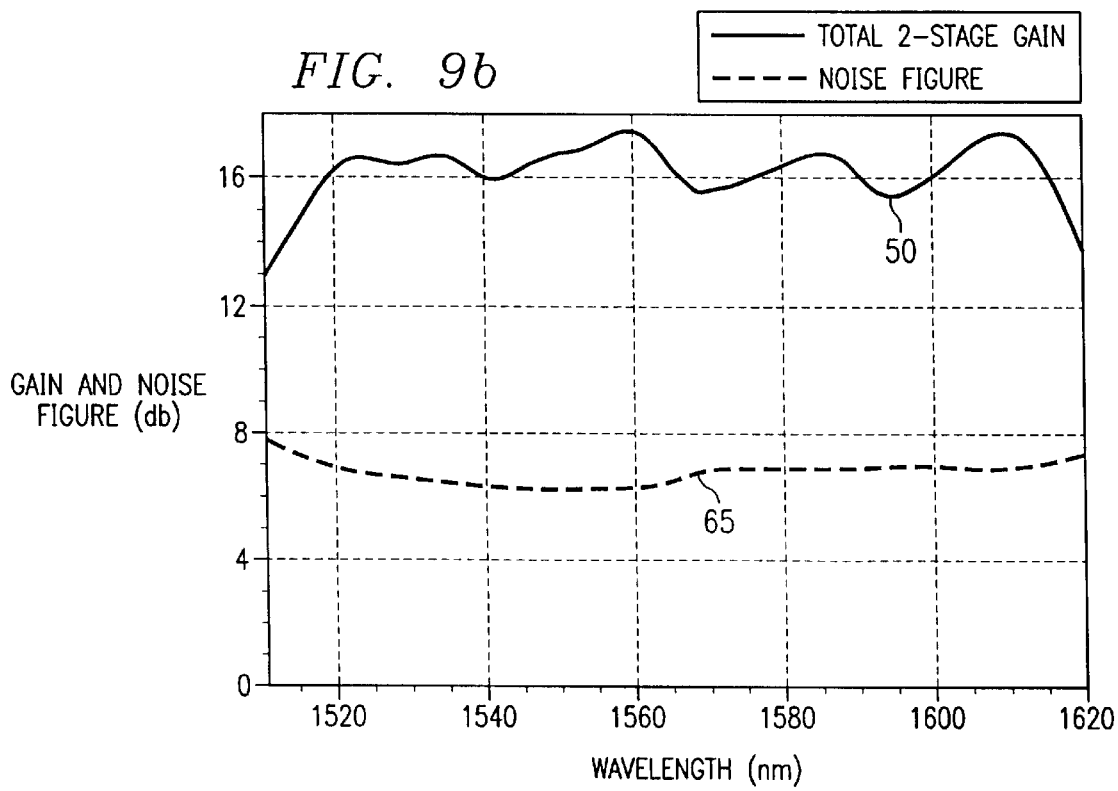

FIGS. 8a–8b are graphs showing simulations of one aspect of the present invention embodied in a two stage distributed Raman amplifier. FIGS. 9a–9b are graphs showing simulations of one aspect of the present invention embodied in a two stage discrete Raman amplifier. The parameters used for the amplifier simulations were as follows:

|  | Distributed | Discrete |
| --- | --- | --- |
| Stage 1 |  |  |
| Input Port Loss Stage 1 | 0 dB | 1.3 dB |
| Gain Fiber Stage 1 | 80 km LEAF fiber | DK-21 (DCF) |
| Pump Powers: | 438 mW @ 1396 nm |  |
|  | 438 mW @ 1416 nm | 380 mW @ 416 nm |
|  | 438 mW @ 1427 nm | 380 mW @ 1427 nm |
|  | 170 mW @ 1450 nm | 220 mW @ 1450 nm |
|  | 10 mW @ 1472 nm |  |
|  | 4 mW @ 1505 nm | 19 mW @ 1505 nm |
| Mid-Stage Loss Stage 2 | 2 dB | 1.6 dB |
| Gain Fiber Stage 2 | DK-30 (DCF) | DK-19 (DCF) |
| Pump Powers: | 380 mW @ 1399 nm |  |
|  | 380 mW @ 1472 nm | 380 mW @ 1472 nm |
|  | 380 mW @ 1505 nm | 380 mW @ 1505 nm |
| Stage 2 |  |  |
| Output Port Loss | 1 dB | 1.3 dB |

FIGS. 8a and 9A show first gain profile 30 of first stage 112, second gain profile 40 of second stage 114, and composite gain profile 50 of Raman amplifier 100 for distributed and discrete configurations, respectively. As shown in these figures application of pump wavelengths 124 as shown in Table 1 above results in a downwardly sloping gain profile 30 for first stage 112, and an upwardly sloping gain profile 40 for second stage 114. Gain profiles 30 and 40 are approximately complementary to one another, although they do not comprise mirror images of one another.

The composite gain profile 50 of amplifier 100 is approximately flat across the bandwidth of signal 116 being amplified. Gain profile 50 represents the gain profile without application of any gain flattening filters. In this embodiment, amplifier 100 obtains an overall gain profile that is approximately flat for over 100 nanometers.

FIGS. 8b and 9b show the same gain profile 50 and compare that profile to the noise figure of the amplifier. In the case of the discrete Raman amplifier simulated in FIG. 9b, the actual noise FIG. 55 is shown. In the case of the distributed Raman amplifier simulated in FIG. 8b, the effective noise FIG. 65 is shown.

An optical amplifier noise figure is defined as NF SNRin/SNRout where SNRin is the signal-to-noise ratio of the amplifier input signal and SNRout is the signal-to-noise ratio of the amplifier output signal. As defined, NF is always greater then 1 for any realizable amplifier. Effective noise figure for a distributed optical amplifier is defined as the noise figure a discrete amplifier placed at the end of the distributed amplifier transmission fiber would need to have to produce the same final SNR as the distributed amplifier. It can be, and in practice is, less than 1 (negative value in dB) for practical distributed amplifiers over at least a small portion of their operating wavelength range.

As shown in FIGS. 8b and 9b, the noise figure in this embodiment is always less than eight decibels over the entire bandwidth of signal 116. In fact, for a bandwidth between 1520 nanometers and 1620 nanometers, the noise figure never exceeds 7 decibels.

Although the present invention has been described in several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A multi-stage optical amplifier, comprising:
   a first Raman amplifier stage operable to amplify a plurality of signal wavelengths, the first Raman stage having a gain profile wherein a majority of shorter signal wavelengths are amplified more than a majority of longer signal wavelengths; and
   a second Raman amplifier stage coupled to the first Raman amplifier stage and operable to amplify at least most of the plurality of signal wavelengths after those wavelengths have been amplified by the first stage, the second Raman stage having a gain profile wherein a majority of the longer signal wavelengths are amplified more than a majority of the shorter signal wavelengths;
   wherein an overall gain profile for the amplifier over the at least a portion of the plurality of signal wavelengths is approximately flat.

2. The amplifier of claim 1, wherein the first and second Raman stages operate to amplify all of the same signal wavelengths.

3. The amplifier of claim 1, wherein one of the first and second Raman amplifier stages comprises a distributed Raman amplifier stage and wherein the other of the first and second Raman amplifier stages comprises a discrete Raman amplifier stage.

4. The amplifier of claim 1, wherein the overall gain profile of the amplifier is approximately flat over at least 40 nanometers of the plurality of signal wavelengths.

5. The amplifier of claim 1, wherein the overall gain profile of the amplifier is approximately flat over at least 60 nanometers of the plurality of signal wavelengths.

6. The amplifier of claim 1, wherein the overall gain profile of the amplifier is approximately flat over at least 70 nanometers of the plurality of signal wavelengths.

7. The amplifier of claim 1, wherein the overall gain profile of the amplifier is approximately flat over at least 80 nanometers of the plurality of signal wavelengths.

8. The amplifier of claim 1, wherein the overall gain profile of the amplifier without the use of a gain flattening filter would vary by less than five decibels over the at least 60 nanometers.

9. The amplifier of claim 1, wherein the overall gain profile of the amplifier without the use of a gain flattening filter would vary by less than three decibels over the at least 60 nanometers.

10. The amplifier of claim 1, wherein the overall gain profile of the amplifier without the use of a gain flattening filter would vary by less than one decibel over the at least 60 nanometers.

11. The amplifier of claim 1, wherein the gain profiles of the first and second Raman amplifier stages are each determined at least in part by at least some of a plurality of pump wavelength signals, and wherein the plurality of pump wavelength signals comprise a shortest pump wavelength and a longest pump wavelength.

12. The amplifier of claim 11, wherein a highest level of gain supplied by the longest pump wavelength is supplied in a last Raman amplifier stage of the amplifier.

13. The amplifier of claim 11, wherein the first Raman amplifier stage comprises an initial Raman stage of the amplifier and wherein the first Raman stage operates to apply a higher gain level to a signal wavelength closest to the longest pump wavelength than a gain applied to a signal furthest from the longest pump wavelength.

14. The amplifier of claim 11, wherein the longest pump wavelength that provides Raman gain to at least a portion of the signal wavelengths comprises a wavelength at least 5 and no more than 50 nanometers shorter than the shortest wavelength of the plurality of signal wavelengths.

15. The amplifier of claim 1, wherein each of the first and second Raman amplifier stages comprises a gain fiber and wherein a small signal noise figure developed in of the gain fibers of the first and second amplifier stages is no greater than 6 decibels over at least 60 nanometers of the plurality of signal wavelengths.

16. The amplifier of claim 1, wherein an increase in noise figure of the amplifier due to phonon stimulated noise comprises no more than four decibels.

17. The amplifier of claim 1, wherein the gain profiles of the first and second Raman amplifier stages comprise approximately complementary gain profiles.

18. The amplifier of claim 1, wherein at least two stages of the amplifier are coupled so as to cause longer pump wavelengths supplied to one of the stages to accept power from shorter pump wavelengths supplied to another of the stages.

19. The amplifier of claim 1, wherein at least one of the first Raman amplifier stage and the second Raman amplifier stage imparts a net gain to at least a portion of the plurality of signal wavelengths.

20. The amplifier of claim 1, further comprising at least one additional amplifier stage operable to amplify at least some of the plurality of signal wavelengths before those signal wavelengths are received by the first Raman amplifier stage.

21. The amplifier of claim 1, further comprising at least one additional amplification stage coupled between the first and second Raman amplification stages.

22. The amplifier of claim 1, further comprising a rare earth doped amplifier stage coupled to at least one of the first or second Raman amplifier stage.

23. The amplifier of claim 1, further comprising a gain flattening filter coupled to the amplifier, the gain flattening filter operable to further flatten the gain profile of the amplifier.

24. The amplifier of claim 1, further comprising a third Raman amplifier stage coupled to the second Raman amplifier stage and operable to amplify at least most of the plurality of signal wavelengths after those wavelengths have been amplified by the second stage.

25. The amplifier of claim 24, wherein the third Raman amplifier stage comprises a gain profile wherein a majority of the longer signal wavelengths are amplified more than a majority of the shorter signal wavelengths.

26. The amplifier of claim 24, wherein the third Raman amplifier stage comprises a gain profile wherein a majority of the shorter signal wavelengths are amplified more than a majority of the longer signal wavelengths.

27. A method of amplifying an optical signal having multiple wavelengths, the method comprising:
amplifying a plurality of signal wavelengths at a first Raman amplifier stage having a gain profile wherein a majority of shorter signal wavelengths are amplified more than a majority of longer signal wavelengths; and
amplifying at least most of the plurality of signal wavelengths at a second Raman amplifier stage after those signal wavelengths have been amplified by the first stage, the second Raman amplifier stage having a gain profile wherein a majority of the longer signal wavelengths are amplified more than a majority of the shorter signal wavelengths;
wherein an overall gain profile for the amplifier over the at least a portion of the plurality of signal wavelengths is approximately flat.

28. The method of claim 27, wherein the first and second Raman stages operate to amplify all of the same signal wavelengths.

29. The method of claim 27, wherein the overall gain profile of the amplifier is approximately flat over at least 40 nanometers of the plurality of signal wavelengths.

30. The method of claim 27, wherein the overall gain profile of the amplifier is approximately flat over at least 60 nanometers of the plurality of signal wavelengths.

31. The method of claim 27, wherein the overall gain profile of the amplifier is approximately flat over at least 70 nanometers of the plurality of signal wavelengths.

32. The method of claim 27, wherein the overall gain profile of the amplifier is approximately flat over at least 80 nanometers of the plurality of signal wavelengths.

33. The method of claim 27, wherein the overall gain profile of the amplifier without the use of a gain flattening filter would vary by less than five decibels over the at least 60 nanometers.

34. The method of claim 27, wherein the overall gain profile of the amplifier without the use of a gain flattening filter would vary by less than three decibels over the at least 60 nanometers.

35. The method of claim 27, wherein the overall gain profile of the amplifier without the use of a gain flattening filter would vary by less than one decibel over the at least 60 nanometers.

36. The method of claim 27, further comprising applying a gain flattening filter to at least some of the plurality of signal wavelengths to further flatten the overall gain profile of the amplifier.

37. The method of claim 27, further comprising, at the first Raman amplifier stage, applying a higher gain level to one of the plurality of signal wavelengths closest in wavelength to a longest pump wavelength than a gain applied to one of the plurality of signal wavelengths furthest in wavelength from the longest pump wavelength.

38. The method of claim 27, further comprising applying in a last Raman amplifier stage, a highest level of gain supplied by a longest pump wavelength signal that provides Raman gain to at least a portion of the plurality of signal wavelengths.

39. An optical amplification system, comprising:
a plurality of optical amplifiers coupled to an optical communication link, each operable to receive at least a majority of a plurality of wavelength signals, wherein the plurality of optical amplifiers comprises:
a first Raman amplifier comprising a gain profile wherein a majority of shorter wavelength signals are amplified more than a majority of longer wavelength signals; and
a second Raman amplifier comprising a gain profile wherein a majority of longer wavelength signals are amplified more than a majority of shorter wavelength signals;
wherein an overall gain profile for the plurality of wavelength signals after traversing the optical link is approximately flat over at least a portion of the plurality of wavelength signals.

40. The system of claim 39, wherein the overall gain profile for the plurality of wavelength signals after traversing the optical link is approximately flat over at least 40 nanometers of the wavelength signals.

41. The system of claim 39, wherein the overall gain profile for the plurality of wavelength signals after traversing the optical link is approximately flat over at least 60 nanometers of the wavelength signals.

42. The system of claim 39, wherein the overall gain profile for the plurality of wavelength signals after traversing the optical link is approximately flat over at least 80 nanometers of the wavelength signals.

43. The system of claim 39, wherein the overall gain profile over at least 60 nanometers of the plurality of wavelength signals after traversing the optical link would vary by less than five decibels without the use of a gain flattening filter.

44. The system of claim 39, wherein the overall gain profile over at least 60 nanometers of the plurality of wavelength signals after traversing the optical link would vary by less than three decibels without the use of a gain flattening filter.

45. The system of claim 39, wherein the overall gain profile over at least 60 nanometers of the plurality of wavelength signals after traversing the optical link would vary by less than one decibel without the use of a gain flattening filter.

* * * * *

UNITED STATES PATENT AND TRADEMARK OFFICE
CERTIFICATE OF CORRECTION

PATENT NO.   : 6,646,788 B2
DATED        : November 11, 2003
INVENTOR(S)  : Mohammed N. Islam et al.

It is certified that error appears in the above-identified patent and that said Letters Patent is hereby corrected as shown below:

<u>Title page,</u>
Item [75], Inventors, after "Carl A. Dewilde, Richardson, TX (US)" insert
-- Michael J. Freeman, Canton, MI (US) --.

Signed and Sealed this

Ninth Day of March, 2004

JON W. DUDAS
*Acting Director of the United States Patent and Trademark Office*